US009102509B2

(12) United States Patent
Buck et al.

(10) Patent No.: US 9,102,509 B2
(45) Date of Patent: Aug. 11, 2015

(54) MAKE-UP DISPENSE IN A MASS BASED DISPENSING SYSTEM

(75) Inventors: Christopher A. Buck, St. Paul, MN (US); Wesley M. Nelson, Maplewood, MN (US); Blake Roberts Otting, Richfield, MN (US)

(73) Assignee: Ecolab Inc., St. Paul, MN (US)

( * ) Notice: Subject to any disclaimer, the term of this patent is extended or adjusted under 35 U.S.C. 154(b) by 329 days.

(21) Appl. No.: 12/567,266

(22) Filed: Sep. 25, 2009

(65) Prior Publication Data

US 2011/0077772 A1    Mar. 31, 2011

(51) Int. Cl.
| G06F 17/00 | (2006.01) |
| B67D 7/06 | (2010.01) |
| B67D 7/02 | (2010.01) |
| A47L 15/00 | (2006.01) |
| B67D 7/14 | (2010.01) |
| B67D 7/36 | (2010.01) |
| D06F 33/02 | (2006.01) |
| D06F 39/02 | (2006.01) |
| G01G 13/16 | (2006.01) |
| G01G 17/06 | (2006.01) |
| A47L 15/44 | (2006.01) |

(52) U.S. Cl.
CPC .............. *B67D 7/02* (2013.01); *A47L 15/0055* (2013.01); *B67D 7/0294* (2013.01); *B67D 7/14* (2013.01); *B67D 7/36* (2013.01); *D06F 33/02* (2013.01); *D06F 39/02* (2013.01); *G01G 13/16* (2013.01); *G01G 17/06* (2013.01); *A47L 15/4463* (2013.01); *A47L 2401/023* (2013.01); *A47L 2501/07* (2013.01)

(58) Field of Classification Search
CPC ............ A47L 15/0055; A47L 15/4463; A47L 2501/07; G01G 17/06; B67D 7/36; B67D 7/0294
USPC ........................................................ 700/240
See application file for complete search history.

(56) References Cited

U.S. PATENT DOCUMENTS

| 33,861 A | 12/1861 | Whitney |
| 1,985,615 A | 12/1934 | Mitchell |
| 2,219,597 A | 10/1940 | Lutz |

(Continued)

FOREIGN PATENT DOCUMENTS

| DE | 3933763 A | 4/1991 |
| DE | 4419415 A1 | 12/1995 |

(Continued)

OTHER PUBLICATIONS

Nova Controls, Nova News, "Save Money and Gain Sales Features?" Aug. 12, 1992, 1 pg.

(Continued)

*Primary Examiner* — Michael K Collins
(74) *Attorney, Agent, or Firm* — Shumaker & Sieffert, P.A.

(57) ABSTRACT

A chemical product dispenser dispenses a chemical product having at least one active ingredient during a primary dispense cycle based on time or some other factor. After the chemical product has been dispensed, the dispenser determines the amount of chemical product that was dispensed. The dispenser then determines whether the dispensed amount of chemical product is within a defined threshold of a desired amount. If not, the dispenser proceeds to dispense additional chemical product during one or more make-up dispense cycles until the threshold is satisfied.

15 Claims, 13 Drawing Sheets

(56) References Cited

U.S. PATENT DOCUMENTS

| | | |
|---|---|---|
| 2,254,269 A | 9/1941 | Clark et al. |
| 2,319,739 A | 5/1943 | Kessler |
| 2,333,791 A | 11/1943 | Hutchinson, Jr. |
| 2,594,975 A | 4/1952 | Mylting |
| 2,679,374 A | 5/1954 | Mylting |
| 2,714,472 A | 8/1955 | Richardson |
| 2,990,707 A | 7/1961 | Gerhardt et al. |
| 3,091,327 A | 5/1963 | Lalley |
| 3,136,157 A | 6/1964 | Seed et al. |
| 3,197,980 A | 8/1965 | Marple |
| 3,412,254 A | 11/1968 | Meyer-Doering et al. |
| 3,447,906 A | 6/1969 | Zimmerli |
| 3,526,334 A | 9/1970 | Ashton et al. |
| 3,578,094 A | 5/1971 | Henry et al. |
| 3,653,544 A | 4/1972 | Young et al. |
| 3,656,478 A | 4/1972 | Swersey |
| 3,743,598 A | 7/1973 | Field |
| 3,754,871 A | 8/1973 | Hessel et al. |
| 3,760,166 A | 9/1973 | Adams et al. |
| 3,772,193 A | 11/1973 | Nelli et al. |
| 3,774,056 A | 11/1973 | Sample et al. |
| 3,796,349 A | 3/1974 | Weber |
| 3,826,113 A | 7/1974 | Noraas et al. |
| 3,826,408 A | 7/1974 | Berndt et al. |
| 3,828,869 A * | 8/1974 | Sellers ............ 177/50 |
| 3,834,587 A | 9/1974 | Bengt et al. |
| 4,040,515 A | 8/1977 | Hessel |
| 4,046,996 A | 9/1977 | Williams et al. |
| 4,076,146 A | 2/1978 | Lausberg et al. |
| 4,195,500 A | 4/1980 | Tobita et al. |
| 4,199,001 A | 4/1980 | Kratz |
| 4,211,517 A | 7/1980 | Schmid |
| 4,222,496 A | 9/1980 | Start et al. |
| 4,241,400 A | 12/1980 | Kiefer |
| 4,247,396 A | 1/1981 | Buesing |
| 4,265,266 A | 5/1981 | Kierbow et al. |
| 4,301,510 A * | 11/1981 | Ricciardi et al. ............ 700/305 |
| 4,307,787 A | 12/1981 | Raboud et al. |
| 4,320,855 A | 3/1982 | Ricciardi et al. |
| 4,334,784 A | 6/1982 | Engels |
| 4,350,186 A * | 9/1982 | Schalkowsky et al. ......... 141/83 |
| 4,353,482 A | 10/1982 | Tomlinson et al. |
| 4,373,418 A | 2/1983 | Rhodes et al. |
| 4,396,828 A | 8/1983 | Dino et al. |
| 4,402,426 A | 9/1983 | Faulkner et al. |
| 4,404,639 A | 9/1983 | McGuire et al. |
| 4,433,917 A | 2/1984 | Mendel et al. |
| 4,463,844 A | 8/1984 | Huffman et al. |
| 4,482,785 A | 11/1984 | Finnegan et al. |
| 4,486,910 A | 12/1984 | Saalmann et al. |
| 4,509,543 A | 4/1985 | Livingston et al. |
| 4,513,796 A | 4/1985 | Miller et al. |
| 4,526,215 A | 7/1985 | Harrison et al. |
| 4,573,606 A | 3/1986 | Lewis et al. |
| RE32,101 E | 4/1986 | Ricciardi et al. |
| RE32,102 E | 4/1986 | Ricciardi et al. |
| 4,597,091 A | 6/1986 | Blake |
| 4,630,654 A | 12/1986 | Kennedy, Jr. |
| 4,632,198 A | 12/1986 | Uchimura |
| 4,660,667 A | 4/1987 | Uchimura et al. |
| 4,676,399 A | 6/1987 | Burckhardt |
| 4,690,230 A | 9/1987 | Uchimura et al. |
| 4,690,305 A | 9/1987 | Copeland |
| 4,697,243 A | 9/1987 | Moore et al. |
| 4,707,848 A | 11/1987 | Durston et al. |
| 4,711,370 A | 12/1987 | Goudy, Jr. et al. |
| 4,733,971 A | 3/1988 | Pratt |
| 4,756,321 A | 7/1988 | Livingston et al. |
| 4,766,548 A | 8/1988 | Cedrone et al. |
| 4,770,859 A | 9/1988 | Heiser, Jr. |
| 4,789,014 A | 12/1988 | DiGianfilippo et al. |
| 4,826,661 A | 5/1989 | Copeland et al. |
| 4,830,508 A | 5/1989 | Higuchi et al. |
| 4,834,546 A | 5/1989 | Pütz |
| 4,836,685 A | 6/1989 | Verreault |
| 4,837,811 A | 6/1989 | Butler et al. |
| 4,843,579 A * | 6/1989 | Andrews et al. ............ 700/305 |
| 4,845,965 A | 7/1989 | Copeland et al. |
| 4,848,381 A | 7/1989 | Livingston et al. |
| 4,858,449 A | 8/1989 | Lehn |
| 4,867,196 A | 9/1989 | Zetena et al. |
| 4,867,343 A | 9/1989 | Ricciardi et al. |
| 4,872,763 A | 10/1989 | Higuchi et al. |
| 4,908,190 A | 3/1990 | Maglio et al. |
| 4,938,240 A | 7/1990 | Lakhan et al. |
| 4,944,428 A | 7/1990 | Gmür et al. |
| 4,964,185 A | 10/1990 | Lehn |
| 4,967,811 A | 11/1990 | DiGianfilippo et al. |
| 4,969,011 A | 11/1990 | Faull et al. |
| 4,974,646 A | 12/1990 | Martin et al. |
| 4,976,137 A * | 12/1990 | Decker et al. ................ 324/439 |
| 4,980,292 A | 12/1990 | Elbert et al. |
| 4,999,124 A | 3/1991 | Copeland |
| 5,006,995 A | 4/1991 | Toschi et al. |
| 5,014,211 A | 5/1991 | Turner et al. |
| 5,014,877 A | 5/1991 | Roos |
| 5,024,352 A | 6/1991 | Gmür et al. |
| 5,036,479 A | 7/1991 | Prednis et al. |
| 5,038,807 A | 8/1991 | Bailey et al. |
| 5,038,973 A | 8/1991 | Gmür |
| 5,040,699 A | 8/1991 | Gangemi |
| 5,043,860 A | 8/1991 | Koether et al. |
| 5,053,206 A | 10/1991 | Maglio et al. |
| 5,064,094 A | 11/1991 | Roos et al. |
| 5,115,842 A | 5/1992 | Crafts et al. |
| 5,136,281 A | 8/1992 | Bonaquist |
| 5,147,615 A | 9/1992 | Bird et al. |
| 5,158,895 A | 10/1992 | Ashihara et al. |
| 5,203,366 A | 4/1993 | Czeck et al. |
| 5,208,930 A | 5/1993 | Chabard |
| 5,219,224 A | 6/1993 | Pratt |
| 5,222,027 A | 6/1993 | Williams et al. |
| 5,240,326 A | 8/1993 | Evanson |
| 5,268,153 A | 12/1993 | Muller |
| 5,279,448 A | 1/1994 | Hanlin et al. |
| 5,283,639 A | 2/1994 | Esch et al. |
| 5,288,145 A | 2/1994 | Mackey et al. |
| 5,294,022 A | 3/1994 | Earle |
| 5,316,195 A | 5/1994 | Moksnes et al. |
| 5,322,571 A | 6/1994 | Plummer et al. |
| 5,332,311 A | 7/1994 | Volk, Jr. et al. |
| 5,332,312 A | 7/1994 | Evanson |
| 5,340,211 A | 8/1994 | Pratt |
| 5,345,379 A | 9/1994 | Brous et al. |
| 5,369,032 A | 11/1994 | Pratt |
| 5,370,267 A | 12/1994 | Schroeder |
| 5,389,344 A | 2/1995 | Copeland et al. |
| 5,390,385 A | 2/1995 | Beldham |
| 5,397,028 A | 3/1995 | Jesadanont |
| 5,400,018 A | 3/1995 | Scholl et al. |
| 5,404,893 A | 4/1995 | Brady et al. |
| 5,407,598 A | 4/1995 | Olson et al. |
| 5,411,716 A | 5/1995 | Thomas et al. |
| 5,419,355 A | 5/1995 | Brennan et al. |
| 5,427,748 A | 6/1995 | Wiedrich et al. |
| 5,497,914 A | 3/1996 | Maltsis |
| 5,500,050 A | 3/1996 | Chan |
| 5,505,915 A | 4/1996 | Copeland et al. |
| 5,556,478 A | 9/1996 | Brady et al. |
| 5,558,435 A | 9/1996 | Marjo |
| 5,580,448 A | 12/1996 | Brandreth |
| 5,581,982 A | 12/1996 | Schroeder et al. |
| 5,584,025 A | 12/1996 | Keithley et al. |
| 5,584,079 A | 12/1996 | Wong et al. |
| 5,609,417 A | 3/1997 | Otte |
| 5,619,183 A | 4/1997 | Ziegra et al. |
| 5,625,659 A | 4/1997 | Sears |
| 5,625,908 A | 5/1997 | Shaw |
| 5,632,411 A | 5/1997 | Harty et al. |
| 5,636,008 A | 6/1997 | LoBiondo et al. |
| 5,638,417 A | 6/1997 | Boyer et al. |
| 5,653,269 A * | 8/1997 | Miller et al. .................... 141/4 |
| 5,671,262 A | 9/1997 | Boyer et al. |
| 5,679,173 A | 10/1997 | Hartman |

(56) References Cited

U.S. PATENT DOCUMENTS

| | | | |
|---|---|---|---|
| 5,681,400 A | 10/1997 | Brady et al. | |
| 5,694,323 A | 12/1997 | Koropitzer et al. | |
| 5,695,091 A | 12/1997 | Winings et al. | |
| 5,724,261 A | 3/1998 | Denny et al. | |
| 5,745,381 A | 4/1998 | Tanaka et al. | |
| 5,757,664 A | 5/1998 | Rogers et al. | |
| 5,758,300 A | 5/1998 | Abe | |
| 5,759,501 A | 6/1998 | Livingston et al. | |
| 5,761,278 A | 6/1998 | Pickett et al. | |
| 5,762,096 A | 6/1998 | Mirabile | |
| 5,769,536 A | 6/1998 | Kotylak | |
| 5,777,895 A | 7/1998 | Kuroda et al. | |
| H1743 H | 8/1998 | Graves et al. | |
| 5,821,523 A | 10/1998 | Bunte et al. | |
| 5,823,670 A * | 10/1998 | Rushing et al. | 366/152.1 |
| 5,826,749 A | 10/1998 | Howland et al. | |
| 5,827,486 A | 10/1998 | Crossdale | |
| 5,839,097 A | 11/1998 | Klausner | |
| 5,851,291 A | 12/1998 | Poterala et al. | |
| 5,861,881 A | 1/1999 | Freeman et al. | |
| 5,864,783 A | 1/1999 | Struck et al. | |
| 5,875,430 A | 2/1999 | Koether | |
| 5,885,446 A | 3/1999 | McGrew, Jr. | |
| 5,887,975 A | 3/1999 | Mordaunt et al. | |
| 5,897,671 A | 4/1999 | Newman et al. | |
| 5,902,749 A | 5/1999 | Lichtwardt et al. | |
| 5,913,915 A | 6/1999 | McQuinn | |
| 5,931,877 A | 8/1999 | Smith et al. | |
| 5,933,479 A | 8/1999 | Michael et al. | |
| 5,938,074 A | 8/1999 | Dartus | |
| 5,939,974 A | 8/1999 | Heagle et al. | |
| 5,945,910 A | 8/1999 | Gorra | |
| 5,956,487 A | 9/1999 | Venkatraman et al. | |
| 5,961,561 A | 10/1999 | Wakefield, II | |
| 5,967,202 A | 10/1999 | Mullen et al. | |
| 5,973,696 A | 10/1999 | Agranat et al. | |
| 5,974,345 A | 10/1999 | Buck et al. | |
| 5,975,352 A | 11/1999 | Spriggs et al. | |
| 5,979,703 A | 11/1999 | Nystrom | |
| 5,980,090 A | 11/1999 | Royal et al. | |
| 5,987,105 A | 11/1999 | Jenkins et al. | |
| 5,992,686 A | 11/1999 | Cline et al. | |
| 6,003,070 A | 12/1999 | Frantz | |
| 6,007,788 A | 12/1999 | Bellon et al. | |
| 6,012,041 A | 1/2000 | Brewer et al. | |
| 6,029,286 A | 2/2000 | Funk | |
| 6,049,792 A | 4/2000 | Hart et al. | |
| 6,061,668 A | 5/2000 | Sharrow | |
| 6,073,124 A | 6/2000 | Krishnan et al. | |
| 6,082,149 A | 7/2000 | Woods | |
| 6,098,843 A | 8/2000 | Soberanis et al. | |
| 6,120,175 A * | 9/2000 | Tewell | 366/140 |
| 6,129,449 A | 10/2000 | McCain et al. | |
| 6,133,555 A | 10/2000 | Brenn | |
| 6,136,184 A | 10/2000 | King | |
| 6,143,257 A | 11/2000 | Spriggs et al. | |
| 6,164,189 A | 12/2000 | Anson | |
| 6,167,358 A | 12/2000 | Othmer et al. | |
| 6,220,312 B1 | 4/2001 | Hirsch et al. | |
| 6,234,218 B1 | 5/2001 | Boers | |
| 6,249,778 B1 | 6/2001 | Vaghi | |
| 6,259,956 B1 | 7/2001 | Myers et al. | |
| 6,269,975 B2 | 8/2001 | Soberanis et al. | |
| 6,321,204 B1 | 11/2001 | Kazami et al. | |
| 6,330,499 B1 | 12/2001 | Chou et al. | |
| 6,356,205 B1 | 3/2002 | Salvo et al. | |
| 6,357,292 B1 | 3/2002 | Schultz et al. | |
| 6,370,454 B1 | 4/2002 | Moore | |
| 6,377,868 B1 | 4/2002 | Gardner, Jr. | |
| 6,380,495 B1 | 4/2002 | Ash et al. | |
| 6,418,371 B1 | 7/2002 | Arnold | |
| 6,438,471 B1 | 8/2002 | Katagishi et al. | |
| 6,441,322 B1 | 8/2002 | Ash et al. | |
| 6,463,940 B1 | 10/2002 | Thomas et al. | |
| 6,472,615 B1 | 10/2002 | Carlson | |
| 6,490,513 B1 | 12/2002 | Fish et al. | |
| 6,507,966 B1 | 1/2003 | Mitchell et al. | |
| 6,513,964 B1 | 2/2003 | Himmelright et al. | |
| 6,547,097 B1 | 4/2003 | Cavallaro et al. | |
| 6,561,381 B1 | 5/2003 | Osterheld et al. | |
| 6,697,706 B2 | 2/2004 | Gardner, Jr. | |
| 6,707,873 B2 | 3/2004 | Thompson et al. | |
| 6,719,453 B2 | 4/2004 | Cosman et al. | |
| 6,792,395 B2 | 9/2004 | Roberts | |
| 6,845,298 B2 | 1/2005 | Nelson et al. | |
| 6,896,140 B1 | 5/2005 | Perry | |
| 6,921,000 B2 * | 7/2005 | Wagner et al. | 222/1 |
| 6,987,228 B1 | 1/2006 | MacMichael et al. | |
| 7,069,188 B2 | 6/2006 | Roberts | |
| 7,128,215 B2 | 10/2006 | Danechi | |
| 7,175,048 B2 | 2/2007 | Wolfschaffner | |
| 7,201,290 B2 | 4/2007 | Mehus et al. | |
| 7,228,990 B2 | 6/2007 | Schmidt | |
| 7,410,623 B2 | 8/2008 | Mehus et al. | |
| 7,530,729 B2 | 5/2009 | O'Callaghan | |
| 7,803,321 B2 * | 9/2010 | Lark et al. | 422/62 |
| 7,891,523 B2 * | 2/2011 | Mehus et al. | 222/77 |
| 8,240,508 B2 * | 8/2012 | Wegelin et al. | 222/52 |
| 8,277,745 B2 * | 10/2012 | Mehus et al. | 422/264 |
| 2001/0023841 A1 * | 9/2001 | Zimmerman et al. | 210/149 |
| 2001/0038018 A1 | 11/2001 | Bell et al. | |
| 2001/0039501 A1 | 11/2001 | Crevel et al. | |
| 2001/0047214 A1 | 11/2001 | Cocking et al. | |
| 2001/0049846 A1 | 12/2001 | Guzzi et al. | |
| 2001/0053939 A1 | 12/2001 | Crevel et al. | |
| 2001/0054038 A1 | 12/2001 | Crevel et al. | |
| 2002/0014496 A1 | 2/2002 | Cline et al. | |
| 2003/0031084 A1 | 2/2003 | Bartos | |
| 2003/0033156 A1 | 2/2003 | McCall | |
| 2003/0033396 A1 | 2/2003 | McCall | |
| 2003/0043688 A1 | 3/2003 | Peterson et al. | |
| 2003/0121561 A1 * | 7/2003 | Wagner et al. | 141/9 |
| 2003/0155035 A1 | 8/2003 | Ichikawa et al. | |
| 2003/0195656 A1 | 10/2003 | Gardner, Jr. | |
| 2004/0015269 A1 * | 1/2004 | Jungmann et al. | 700/283 |
| 2004/0088076 A1 | 5/2004 | Gardner, Jr. | |
| 2004/0162850 A1 | 8/2004 | Sanville et al. | |
| 2004/0216500 A1 | 11/2004 | Aouad | |
| 2004/0220844 A1 | 11/2004 | Sanville et al. | |
| 2004/0226755 A1 | 11/2004 | Pottebaum et al. | |
| 2004/0226956 A1 | 11/2004 | Brooks | |
| 2004/0226959 A1 * | 11/2004 | Mehus et al. | 222/1 |
| 2004/0230339 A1 | 11/2004 | Maser et al. | |
| 2004/0232163 A1 | 11/2004 | Reinsch et al. | |
| 2004/0245284 A1 | 12/2004 | Mehus et al. | |
| 2005/0065644 A1 | 3/2005 | Gardner, Jr. et al. | |
| 2005/0072793 A1 | 4/2005 | Mehus et al. | |
| 2005/0102059 A1 | 5/2005 | Gardner, Jr. et al. | |
| 2005/0144737 A1 | 7/2005 | Roepke et al. | |
| 2005/0269348 A1 | 12/2005 | Limback et al. | |
| 2006/0173576 A1 | 8/2006 | Georg et al. | |
| 2007/0000291 A1 | 1/2007 | France et al. | |
| 2007/0106425 A1 * | 5/2007 | Anderson et al. | 700/265 |
| 2007/0154370 A1 | 7/2007 | Mehus et al. | |
| 2008/0058771 A1 | 3/2008 | De Brabanter | |
| 2008/0271928 A1 * | 11/2008 | Mehus et al. | 177/1 |
| 2008/0283145 A1 | 11/2008 | Maxwell | |
| 2009/0037026 A1 * | 2/2009 | Sostaric et al. | 700/265 |
| 2009/0090564 A1 | 4/2009 | Kresina | |
| 2009/0126123 A1 | 5/2009 | Kim et al. | |
| 2009/0151474 A1 | 6/2009 | Mehus et al. | |
| 2009/0171502 A1 | 7/2009 | Freidin | |
| 2009/0294469 A1 * | 12/2009 | Poulain et al. | 222/1 |
| 2010/0163573 A1 * | 7/2010 | Wegelin et al. | 222/1 |

FOREIGN PATENT DOCUMENTS

| | | |
|---|---|---|
| DE | 10016659 | 10/2001 |
| DE | 100 39 408 A1 | 12/2001 |
| EP | 0917906 A1 | 5/1999 |
| GB | 2052251 A1 | 5/1980 |
| GB | 2120563 A | 12/1983 |
| JP | 59142832 A | 8/1984 |
| JP | 60020122 A | 2/1985 |

(56) References Cited

FOREIGN PATENT DOCUMENTS

| | | |
|---|---|---|
| JP | 60150823 A | 8/1985 |
| JP | 61098657 A | 5/1986 |
| JP | 62168529 A | 7/1987 |
| JP | 63001434 A | 1/1988 |
| JP | 01145525 A | 6/1989 |
| JP | 01148916 A | 6/1989 |
| JP | 01207124 A | 8/1989 |
| JP | 04049110 A | 2/1992 |
| JP | 06226068 | 8/1994 |
| JP | 09066995 | 3/1997 |
| JP | 09066999 | 3/1997 |
| JP | 11-502932 | 3/1999 |
| JP | 11156101 | 6/1999 |
| WO | 98/26704 | 6/1998 |
| WO | 03/059143 | 7/2003 |
| WO | 2006133026 A2 | 12/2006 |

OTHER PUBLICATIONS

Novalink™ OverView™ Program Pricing, undated, 1 pg.
Nova Controls, "Orion Liquid Laundry Supply Dipenser," Feb. 1989, 5 pp.
Novalink™ Laundry Information System, ControlMaster Version 2.0 for Windows User's Guide, 2000, 39 pp.
Persyst Inc., "LDAS-2000 Remote Information Control and Management System for the Commercial Laundry and Vending Industry," undated, 4 pp.
Persyst Inc., "Dial-A-Wash Automatic Laundry Room Attendant for Apartment and Complex Laundry Rooms," undated, 2 pp.
PowerPoint Presentation: "Ecolab$^{SM}$ Aramark Uniform Services Joining Forces for Service Excellence," 1998, 69 pp.
T-JET™ 2000 PC, "Wash-Aisle Productivity Manager Software Guide," Ecolab® Textile Care Division, undated, 29 pp.
Sample Reports, Nova Controls, Oct. 1997, 8 pp.
Sample Reports, Novalink™ System, Jan. 1996, 9 pp.
Nexgen SI, Inc., "InTouch Water Treatment Information Management Solution," Mar. 29, 1999, 59 pp.
Novalink™ brochure: "Laundry Information System: Overview Reports," Dec. 13, 1995, 6 pp.
Diversey, Diverlog-L Enhanced "DLE—Production Summary Reports," Apr. 1990, 5 pp.
Diversey, Diverlog-L Enhanced "DLE Set-up Report," Apr. 1990, 7 pp.
Diversey, Diverlog-L Enhanced "DLE—Single Cycle Reports," Mar. 1990, 5 pp.
Clax Diverflow System, "Advanced Central Dosing Technology for Laundries," copyright Diversey Lever 1998, 3 pp.
Ecolab® Inc., product brochure: "We'd like to make a couple of things perfectly Clear," copyright 1998, 4 pp.
Ecolab® Balancer.com, MRE, Jun. 4, 1997, 4 pp.
Ecolab® Inc., product brochure: "Relax. We've Got Your Pool Concerns Under Control," copyright 1998, 4 pp.
Office Action dated Aug. 14, 2007, for U.S. Appl. No. 10/436,454, 5 pp.
Notice of Allowance mailed Nov. 29, 2007, for U.S. Appl. No, 10/436,454, 7 pp.
Office Action dated May 2, 2008, for U.S. Appl. No. 10/436,454, 6 pp.
Office Action dated Oct. 28, 2008, for U.S. Appl. No. 10/436,454, 6 pp.
Office Action dated Mar. 20, 2009, for U.S. Appl. No. 10/436,454, 7 pp.
Office Action dated Oct. 22, 2009, for U.S. Appl. No. 10/436,454, 8 pp.
Office Action dated Feb. 17, 2009, for U.S. Appl. No. 11,954,425, 13 pp.
Office Action dated Sep. 21, 2009, for U.S. Appl. No. 11/954,425, 17 pp.
Notice of Allowance mailed Dec. 17, 2009, for U.S. Appl. No. 11,954,425, 6 pp.
Office Action dated Jul. 24, 2007, for U.S. Appl. No. 10/843,230, 16 pp.
Office Action dated Nov. 28, 2007, for U.S. Appl. No. 10/843,230, 18 pp.
Office Action dated Jun. 17, 2008, for U.S. Appl. No. 10/843,230, 14 pp.
Office Action dated Sep. 4, 2008, for U.S. Appl. No. 10/843,230, 11 pp.
Office Action dated Mar. 27, 2009, for U.S. Appl. No. 10/843,230, 9 pp.
Office Action dated Nov. 2, 2009, for U.S. Appl. No. 10/843,230, 10 pp.
Office Action dated Jan. 19, 2010, for U.S. Appl. No. 10/843,230, 7 pp.
Office Action dated Jul. 24, 2007 for U.S. Appl. No. 10/843,219, 12 pp.
Office Action dated Jan. 10, 2008 for U.S. Appl. No. 10/843,219, 16 pp.
Notice of Allowance dated May 1, 2008 for U.S. Appl. No. 10/843,219, 8 pp.
Office Action dated Apr. 7, 2009, for U.S. Appl. No. 11/570,411, 38 pp.
Office Action dated Dec. 21, 2009, for U.S. Appl. No. 11/570,411, 23 pp.
U.S. Appl. No. 12/711,892, filed Feb. 24, 2010, entitled "Low and Empty Product Detection Using Load Cell and Load Cell Bracket".
Notice of Allowance from U.S. Appl. No. 12/711,892, dated Feb. 2, 2011, 9 pp.
Office Action from U.S. Appl. No. 11/799,692, dated Feb. 3, 2011, 13 pp.
Response to Office Action dated Feb. 3, 2011, from U.S. Appl. No. 11/799,692, filed May 3, 2011, 8 pp.
Office Action from U.S. Appl. No. 10/436,454, dated Apr. 21, 2010, 15 pp.
Response to Office Action dated Apr. 21, 2010, from U.S. Appl. No. 10/436,454, filed Jun. 21, 2010, 16 pp.
Office Action from U.S. Appl. No. 11/713,964, dated Jul. 7, 2010, 8 pp.
Response to Office Action dated Jul. 7, 2010, from U.S. Appl. No. 11/713,964, filed Oct. 6, 2010, 7 pp.
International Search Report and Written Opinion of international application No. PCT/IB2010/054268, dated Jun. 17, 2011, 9 pp.
Office Action from U.S. Appl. No. 11/799,692, dated Jul. 22, 2011, 15 pp.
Response to Office Action dated Jul. 22, 2011, from U.S. Appl. No. 11/799,692, Oct. 24, 2011, 6 pp.
Response to Office Action dated Dec. 9, 2011, from U.S. Appl. No. 11/799,692, Mar. 9, 2012, 6 pp.
Office Action from U.S. Appl. No. 11/570,411, dated Mar. 18, 2013, 15 pp.
Response to Final Office Action dated Sep. 19, 2013, from U.S. Appl. No. 12/567,266, filed Dec. 19, 2013, 12 pp.
Response to Office Action dated Nov. 29, 2012, from U.S. Appl. No. 12/683,666, filed Jan. 29, 2013, 8 pp.
Amendment in Response to Office Action mailed Mar. 11, 2014, from U.S. Appl. No. 11/570,411, filed Jun. 11, 2014, 13 pp.
Response to Office Action mailed Mar. 18, 2013, from U.S. Appl. No. 11/570,411, filed Jun. 18, 2013, 12 pp.
Decision on Appeal from U.S. Appl. No. 10/436,454, dated Jul. 17, 2013, 14 pp.
Final Office Action from U.S. Appl. No. 11/570,411, dated Sep. 19, 2013, 16 pp.
Office Action from U.S. Appl. No. 12/683,666, dated Aug. 21, 2012, 8 pp.
Response to Office Action dated Aug. 21, 2012, from U.S. Appl. No. 12/683,666, filed Nov. 20, 2012, 7 pp.
Final Office Action from U.S. Appl. No. 12/683,666, dated Nov. 29, 2012, 6 pp.
Office Action from U.S. Appl. No. 11/570,411, dated Mar. 11, 2014, 17 pp.
Notice of Allowance from U.S. Appl. No. 11/570,411, mailed Aug. 6, 2014, 5 pp.

* cited by examiner

MAKE-UP DISPENSE IN A MASS BASED DISPENSING SYSTEM

TECHNICAL FIELD

The invention relates generally to chemical product dispensing.

BACKGROUND

Dispensing systems to dispense an ingredient for a commercial purpose have been widely used in many industries. For example, in the restaurant industry, warewashing systems are employed to rapidly wash large quantities of eating utensils, plates, pots, pans, glassware, etc. In another example in the hotel industry, linens, towels, clothing and the like are washed in commercial cleaning systems. Such systems commonly employ dispensers to dispense chemicals, such as detergents, to effectively perform the washing function.

Many types of dispensers and control systems for such dispensers have been utilized. Such dispensers, control systems and methods for controlling such dispensers have utilized a variety of techniques. As one example, such methods may dispense a predetermined amount of the ingredient into the cleaning apparatus for each cycle of the apparatus. Other systems and methods attempt to determine when the ingredient needs to be replenished in the cleaning apparatus by measuring a characteristic of the cleaning apparatus, e.g., measuring the conductivity of a use solution to determine when additional detergent needs to be added.

SUMMARY

In general, the invention relates to dispensation of chemical products. A chemical product dispenser dispenses a chemical product during a primary dispense cycle based on time or some other factor. After completion of the primary dispense cycle, the dispenser determines the amount of chemical product that was dispensed. The dispenser then determines whether the dispensed amount of chemical product is within a defined threshold of a desired amount. If not, the dispenser proceeds to dispense additional chemical product during one or more make-up dispense cycles until the threshold is satisfied.

In one embodiment, the invention is directed to a method including dispensing a chemical product during a primary dispense cycle, determining a dispensed amount of the chemical product based on a change in weight of the chemical product during the primary dispense cycle, calculating the difference between a desired amount of the chemical product and the dispensed amount of the chemical product and determining whether a make-up dispense cycle is required based on the difference.

The method may further include determining a dispense rate corresponding to the primary dispense cycle, if a make-up dispense cycle is required, computing a make-up dispense cycle time based on the difference between the desired amount and the dispensed amount and the dispense rate corresponding to the primary dispense cycle, and executing the required make-up dispense cycle by dispensing the chemical product for the computed make-up dispense time.

In another embodiment, the invention is direct to a system including a chemical product dispenser that dispenses a chemical product during a primary dispense cycle for a primary dispense time, a measuring instrument that determines a starting weight of the chemical product at the beginning of the primary dispense cycle and that determines an ending weight of the chemical product at the end of the primary dispense cycle and a controller that determines a dispensed amount of the chemical product based on a difference between the starting weight of the chemical product and the ending weight of the chemical product, calculates a difference between a desired amount of the chemical product and the dispensed amount of the chemical product, and determines whether a make-up dispense cycle is required based on the difference.

In addition, the controller may further determine a dispense rate corresponding to the primary dispense cycle and, if a make-up dispense cycle is required, compute a make-up dispense time based on the difference between the desired amount and the dispensed amount and the dispense rate corresponding to the primary dispense cycle, and wherein the dispenser dispenses the chemical product for the computed make-up dispense time during the required make-up dispense cycle.

The details of one or more embodiments of the invention are set forth in the accompanying drawings and the description below. Other features and advantages of the invention will be apparent from the description and drawings, and from the claims.

DETAILED DESCRIPTION

Figure 1:
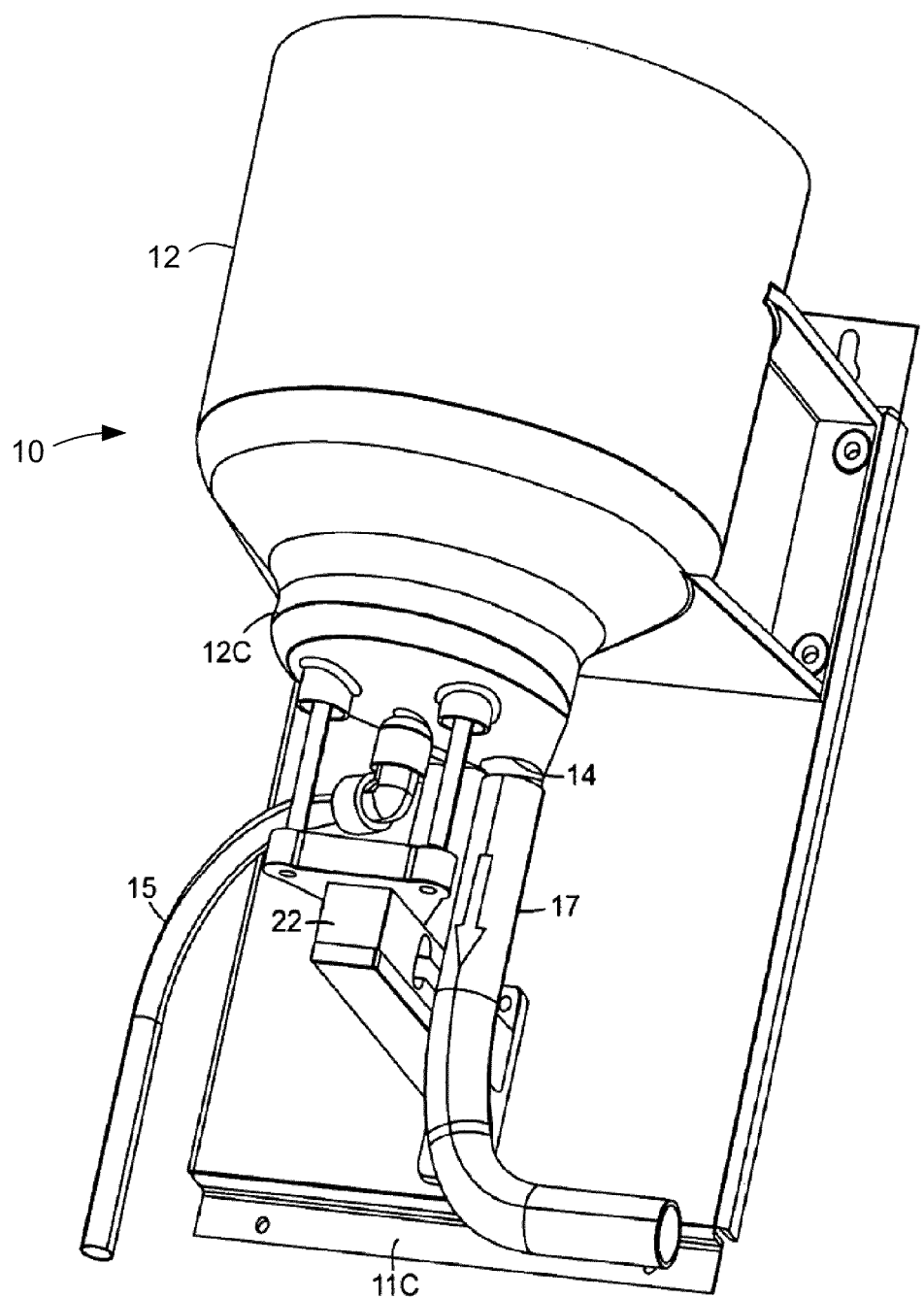
FIG. 1 is an illustration of a dispenser in which some or all of methods of the present invention may find usefulness.

The methods of the present invention can be described, as an example, being used in conjunction with a mass based dispensing system such as a dispensing system described in U.S. Pat. No. 7,201,290, to Mehus et al., issued Apr. 10, 2007 and entitled "Method and Apparatus For Mass Based Dispensing," which is incorporated herein by reference. The dispenser described therein is shown generally in FIG. 1.

Dispenser 10 includes a housing 12 that has an outer wall 12 having a cavity (not shown). Outer wall 12 has a larger diameter at the top so as to accommodate a chemical product capsule or other chemical product (not shown). The product capsule, in this example, contains a solid block of a chemical product, or ingredient, to be dispensed. In other examples, the chemical product need not be contained in a product capsule, and may instead be placed directly into the dispenser. The chemical product may also be an extruded chemical product, a pressed chemical product, tablets, a powder, a gel, a paste, a liquid, or other form of chemical product, whether contained in a product capsule or placed directly into the dispenser. However, by way of example and not limitation, an implementation in which a solid product is eroded with a diluent will be described for purposes of illustration.

In this example, inlet hose 15 allows a diluent to be sprayed into capsule and onto the block of ingredient to be dispensed effectively eroding a portion of the block of ingredient. Sump region 12c provides for a collection region for a use solution of the eroded ingredient and the diluent. Hose 17 is connected to outlet 14 allowing the use solution to be directed to a desired location. Load cell 22 measures that combined weight of capsule, the block of ingredient and any diluent contained in capsule.

Dispenser 10 operates by spraying a diluent through inlet host 15 into capsule and onto the block of ingredient. As the block of ingredient is eroded, a mixture of eroded ingredient and diluent is discharged from dispenser 10 through hose 17. Load cell 22 accurately measures the combined weight before the diluent is sprayed onto the block of ingredient, while the diluent is sprayed onto the block of ingredient and after the diluent is sprayed onto the block of ingredient.

Figure 2:
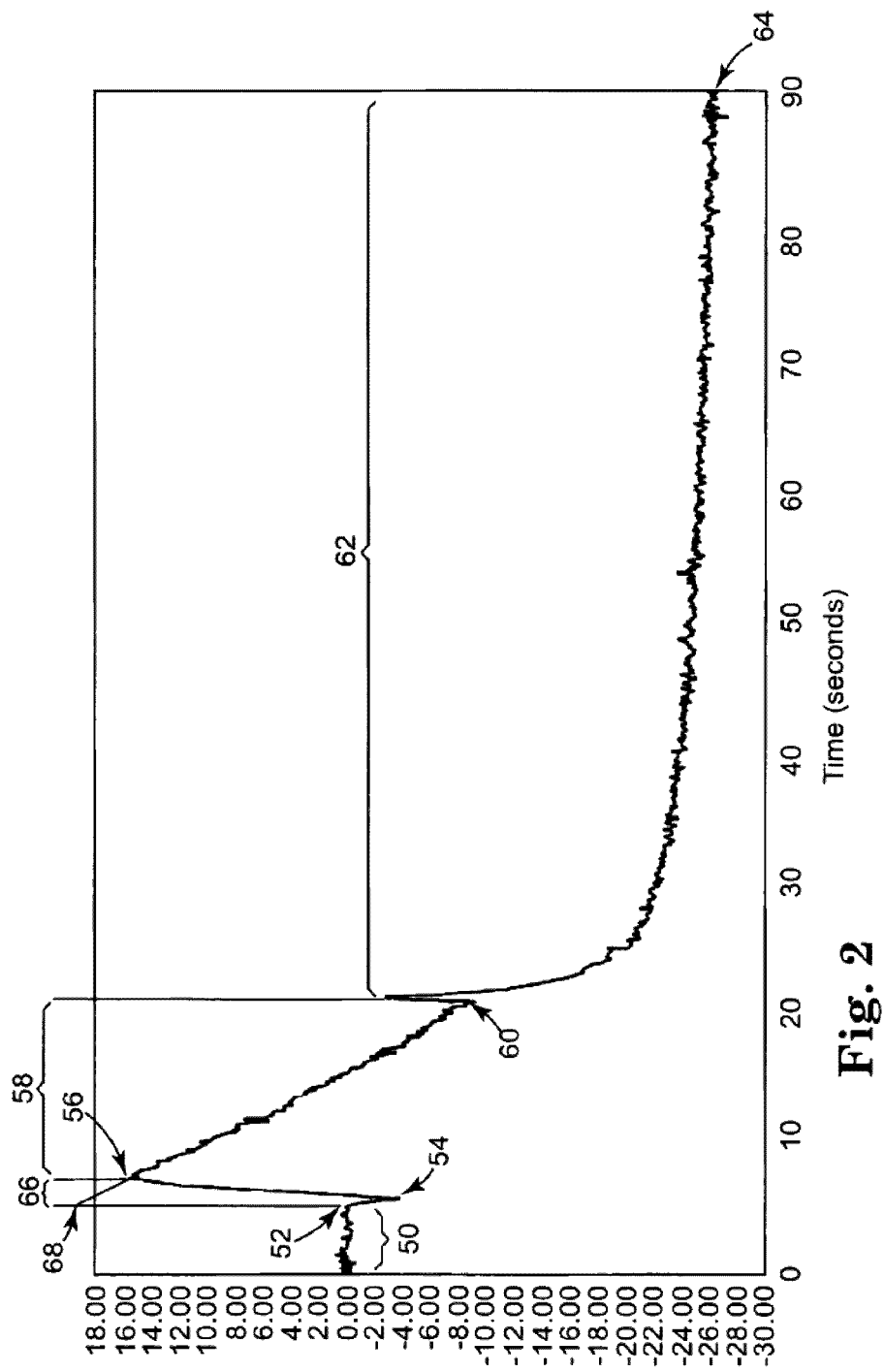
FIG. 2 is a chart illustrating the weight of a dispensing ingredient of the dispenser of FIG. 1.

FIG. 2 is a chart illustrating the effect of the spray of diluent onto the block of ingredient in the dispenser of FIG. 1. The mantissa is time and the ordinate is weight in grams. Time 50 before the initiation of spray represents the starting combined weight, netted out at approximately zero (0) grams, for purposes of illustration. Spray is initiated at time 52 at which point two things begin to happen. First, pressure from the diluent sprayed on the underside of the block of ingredient relieves some of the combined weight from load cell 22. Second, the added weight from diluent accumulating in capsule tends to cause an increased combined weight. Thus, the combined weight on load cell 22 initially decreases until time 54 at which point the combined weight reaches an initial minimum of approximately minus four (−4) grams. Following time 54, the added weight of the diluent in capsule causes the combined weight to rather significantly increase. Over time, however, the added weight of the diluent in capsule tends to stabilize as the block of ingredient is eroded. As the block of ingredient is eroded, its weight decreases. Thus, at time 56 the combined weight reaches a maximum at approximately sixteen (16) grams. Following time 56 the block of ingredient continues to be eroded as the diluent continues to spray. Since the added weight of the diluent in capsule has stabilized, the combined weight continues to decrease during time 58 until the spray is discontinued. The spray of diluent is discontinued at time 60 causing a momentary weight gain for the combined weight as the upward pressure on the block of ingredient is discontinued. Following a momentary weight gain caused by the lack of upward pressure on the block of ingredient by the spray of diluent, diluent continues to drain from capsule during time period 62 resulting in the near final weight at time 64 of approximately minus twenty-six (−26) grams.

The difference between the starting weight at time 50 of approximately zero (0) grams and the ending weight of approximately minus twenty-six (−26) grams, once the diluent has drained from capsule, of twenty-six (26) grams represents the amount of ingredient dispensed. However, note that the difference between the maximum weight of approximately sixteen (16) grams and the weight at time 60 of approximately minus nine (−9) grams when spray is discontinued is only twenty-five (25) grams. This is because ingredient was eroded from the block of ingredient during time 66, between time 52 when spray is begun and time 56 when the maximum is measured, and also during time 62 as diluent drains from capsule.

Figure 3:
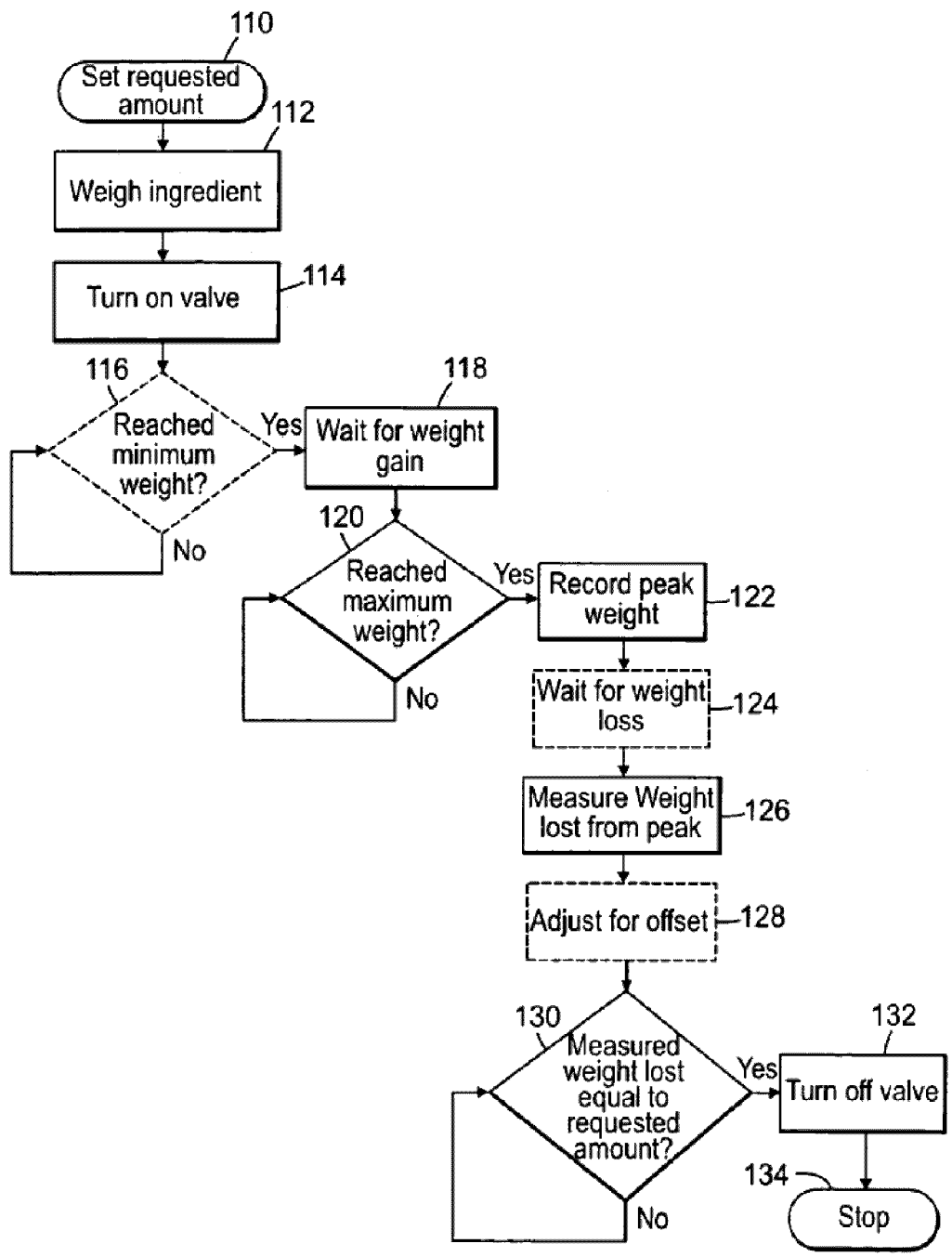
FIG. 3 is a flow chart illustrating an example of the invention in which an ingredient is dispensed by eroding the ingredient with a diluent.

This process can be more readily understood with reference to the flow chart of FIG. 3. A requested amount of the ingredient requested is set (110). Load cell 22 weighs the ingredient (112). A valve is turned on (114) at time 52 initiating the spray of diluent against the block of ingredient. Optionally, the process waits (116) for a minimum weight at time 54 to be reached. The process waits (118) for diluent being added by spray to accumulate in capsule and increase the combined weight. Note that if the step represented by (116) is omitted, it is still proper to wait for weight gain in (118). Alternatively, if the step represented by (116) is not omitted then it is no longer necessary to wait for weight gain and the step represented by (118). Alternatively, the steps represented by both (116) and (118) could be omitted in the process could continue directly to (120). In (120), the method searches for a maximum combined weight at time 56 and, once found, records that peak weight (122). Again optionally, the process waits for weight loss (124). Load cell 22 measures (126) the amount of weight lost from the maximum or peak weight recorded. Optionally, the process adjusts for an offset (128) which is explained below. The process determines (130) whether the measured weight lost is equal to an amount which will result in a dispensed amount of ingredient which equals the requested amount. When such a determination is made, the valve is turned off (132) discontinuing the spray of diluent against the block of ingredient. The process stops (134) until the process is repeated by again setting a requested amount (110).

Since some ingredient will be eroded from the block of ingredient during time 66 (between time 52 when spray is initiated and time 56 when weight loss begins to be recorded) and during time 62 (while remaining diluent drains from capsule), the amount of weight lost from capsule during time 58 does not necessarily equal the total weight of the ingredient eroded and, hence, dispensed. However, an amount of the ingredient which is additionally dispensed during time 66 and time 62 can be calculated and/or estimated by a variety of means. For example, this amount can be determined empirically from previous dispensed cycles. Alternatively, the slope of curve 48 during all or a portion of time 58 may be determined and an original maximum 68 may be determined by regression to account for an amount of the ingredient eroded during time 66. The amount of additional ingredient eroded during times 66 and 62 can be accounted for in the method in block 128 by adjusting the time 60 at which the spray of the diluent is discontinued. For example, if it is determined that the additional amount of the ingredient dispensed during time periods 66 and 62 is equal to approximately one (1) gram, then time 60 can be adjusted to turn off the spray of diluent when the measured weight loss is equal to the requested amount of ingredient minus one (1) gram.

Figure 4:
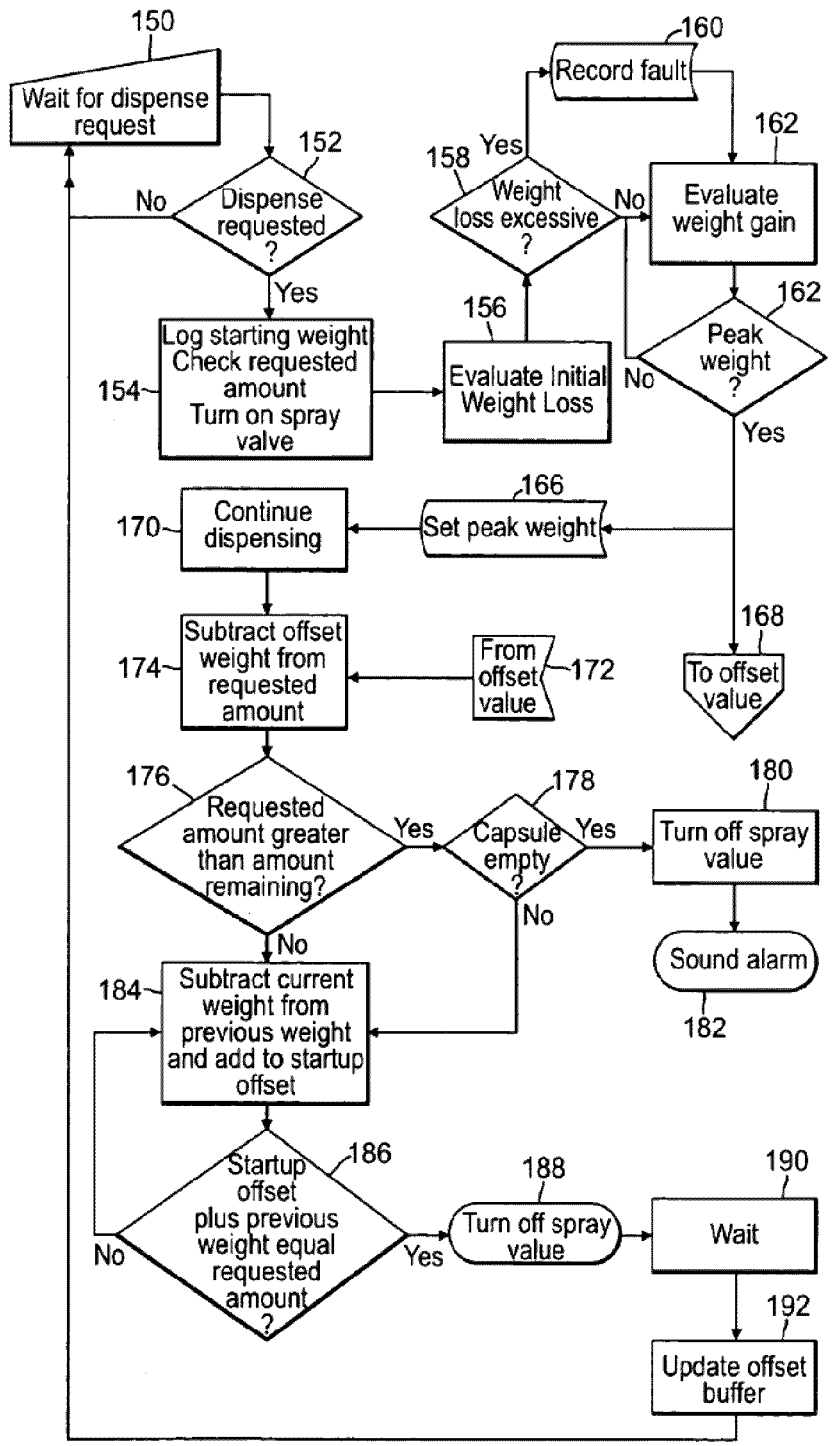
FIG. 4 is a flow chart illustrating a first portion of a more detailed example of the method illustrated in FIG. 3.

FIG. 4 is a flow chart illustrating a more detailed example process. The process starts waiting for a dispense request (150). A determination is made (152) whether or not a dispensed request has occurred. The starting weight is logged, the requested amount is determined and the diluent spray valve is turned on (154). The initial weight loss is evaluated (156). If the weight loss is excessive (158) a fault is recorded (160). The weight gain is evaluated (162) to determine if a peak weight has been reached (164).

If a peak weight has been reached, the peak weight is recorded (166) and a branch is made to compute an offset value (168). Dispensing continues (170) and the offset (from offset value in (172) is subtracted (174) from the requested amount. If the requested amount is greater (176) than the amount remaining, a determination is made (178) whether the capsule is empty. If the capsule is empty, the spray valve is turned off (180) and an alarm is sounded (182). If the capsule is not empty or if the requested amount is still greater than the amount remaining, the current weight is subtracted from the previous weight and added to the startup offset (184). If the startup offset plus the previous weight equals the requested amount (186), the spray valve is turned off (188), the process waits (190) and updates the offset buffer (192) before returning to the wait for dispense request at (150). However, if (186) the startup offset plus the previous weight is not equal to the requested amount, and the process returns to (184) and the current weight is again subtracted from the previous weight and added to the startup offset (184).

Figure 5:
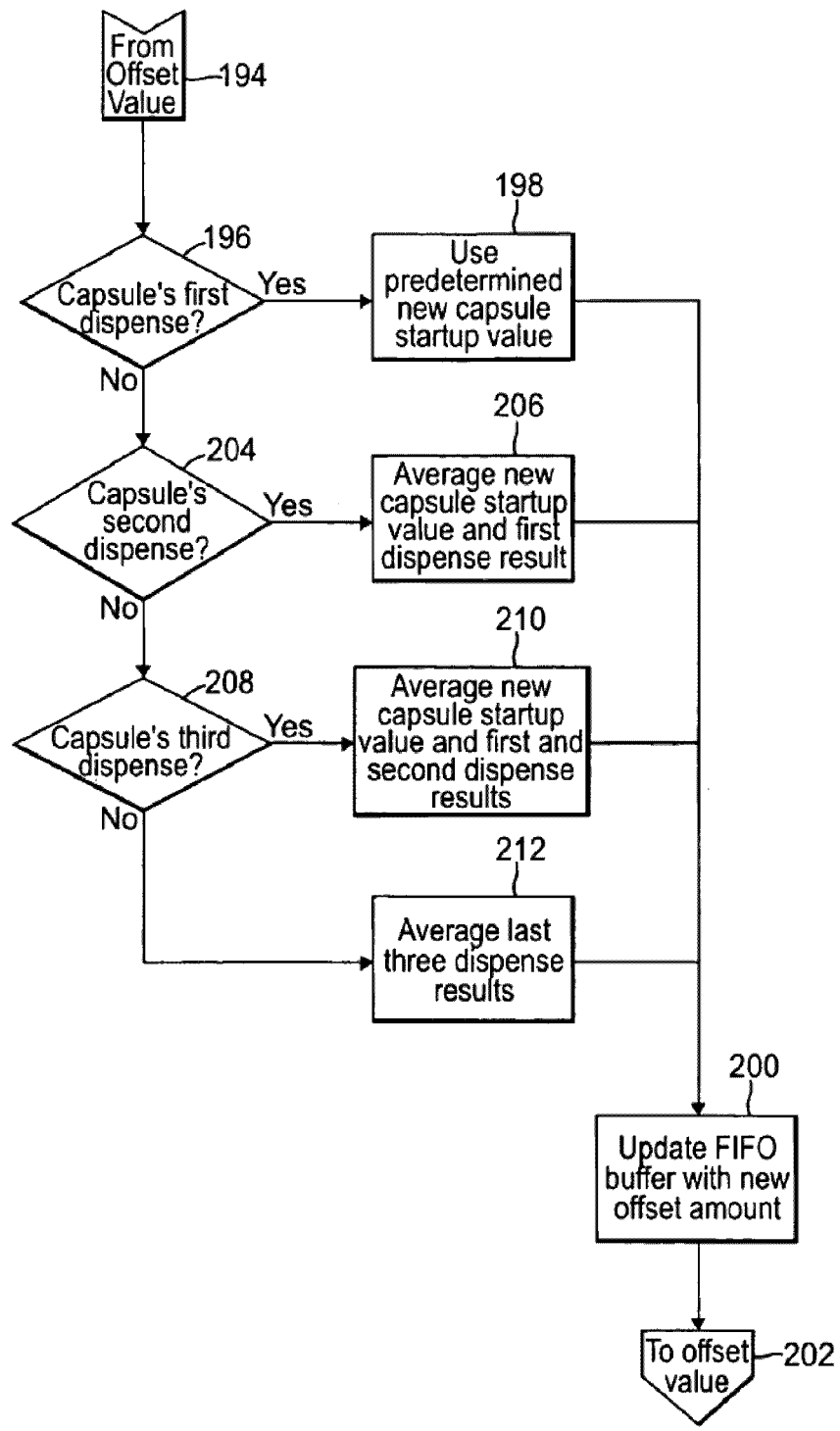
FIG. 5 is a flow chart illustrating a second portion of the method of FIG. 4.

FIG. 5 is a flow chart illustrating the offset value calculation from the flow chart illustrated in FIG. 4. From the offset value in FIG. 4 (194), the process determines whether this is the capsule's first dispense cycle (196). If it is, the process uses a predetermined new capsule startup value (198) before updating the FIFO buffer with the new offset amount (200) and returning (202) to the offset value in FIG. 4. If however (at 196) it is not the capsule's first dispense cycle, the process determines (204) if it is the capsule's second dispense cycle. If it is, an average (206) between the predetermined new capsule startup value and an empirical result from the first dispense cycle is sent to the FIFO buffer (200) and the process returns to FIG. 4 (202). If however (204) it is not the capsule's second dispense cycle, the process determines (208) if it is the capsule's third dispense cycle. If it is, an average (210) of a new capsule startup value and empirical result from the first and second dispense cycles is sent to the FIFO buffer (200) and the process returns to FIG. 4 (202). If however (208) it is not the capsule's third dispense cycle, then an average (212) of the empirical result from the capsule's last three dispensed cycles are used as an offset and sent to the FIFO buffer (200) and the process returns to FIG. 4 (202).

Figure 6:
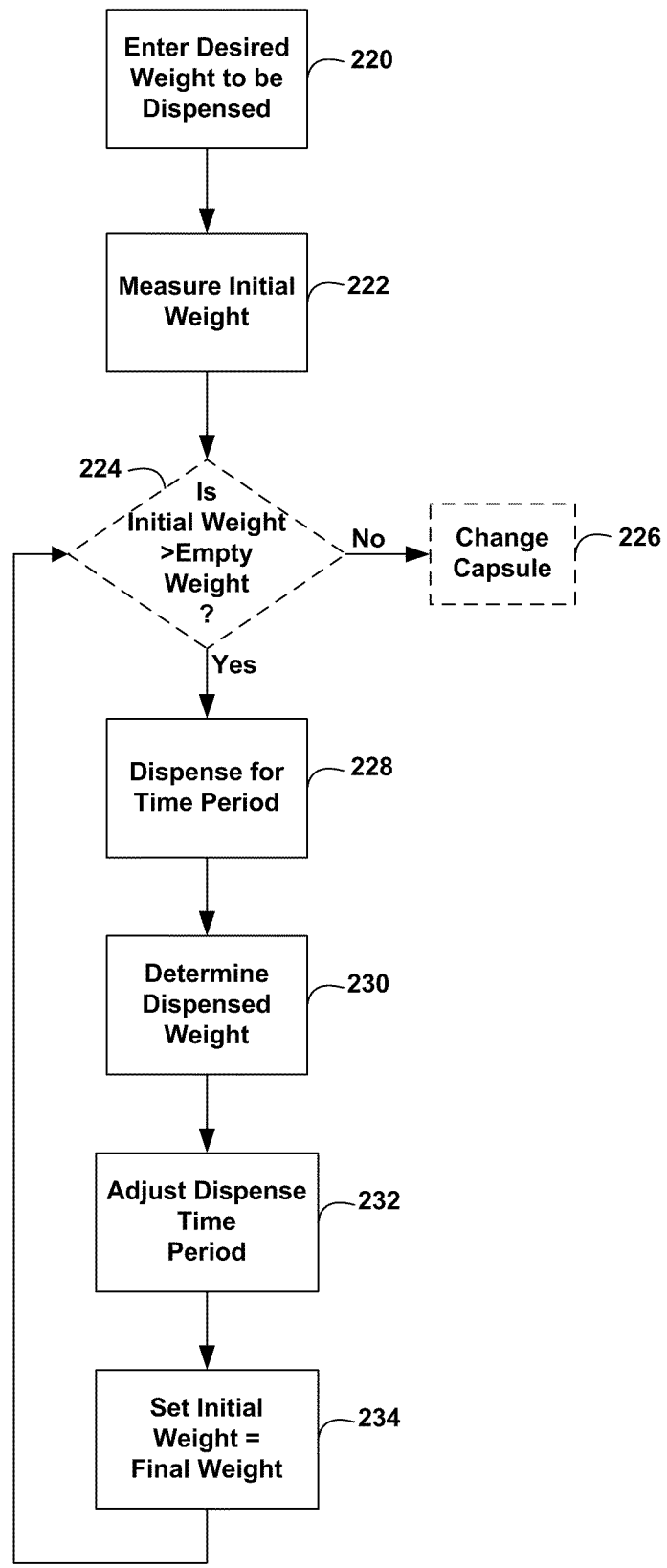
FIG. 6 is a flow chart illustrating an example of the invention in which an ingredient is dispensed based on the result of a previous dispense cycle.

An alternative example of a method of the present invention is illustrated in the flow chart of FIG. 6 which can be utilized, for example, in a dispenser which dispenses an ingredient for a predetermined period of time in each of a plurality of cycles. A desired weight of an amount of the ingredient to be dispensed is determined (220). The initial weight is measured (222). A determination is made (224) on whether the initial weight is greater than the weight of an empty capsule. If the initial weight is not greater than the weight of an empty capsule, the capsule may be changed (226) and the process again measures the initial weight (222). If however the initial weight is greater than the empty weight, the ingredient is dispensed (228) for the predetermined period of time. Following dispensing, the amount of dispensed ingredient is determined (230). If the amount actually dispensed should disagree with the desired amount to be dispensed, the period of time for the next dispense period (228) is appropriately adjusted (232). The initial weight is then set to be equal to the final weight (234) to properly enable the next dispense cycle.

Figure 7:
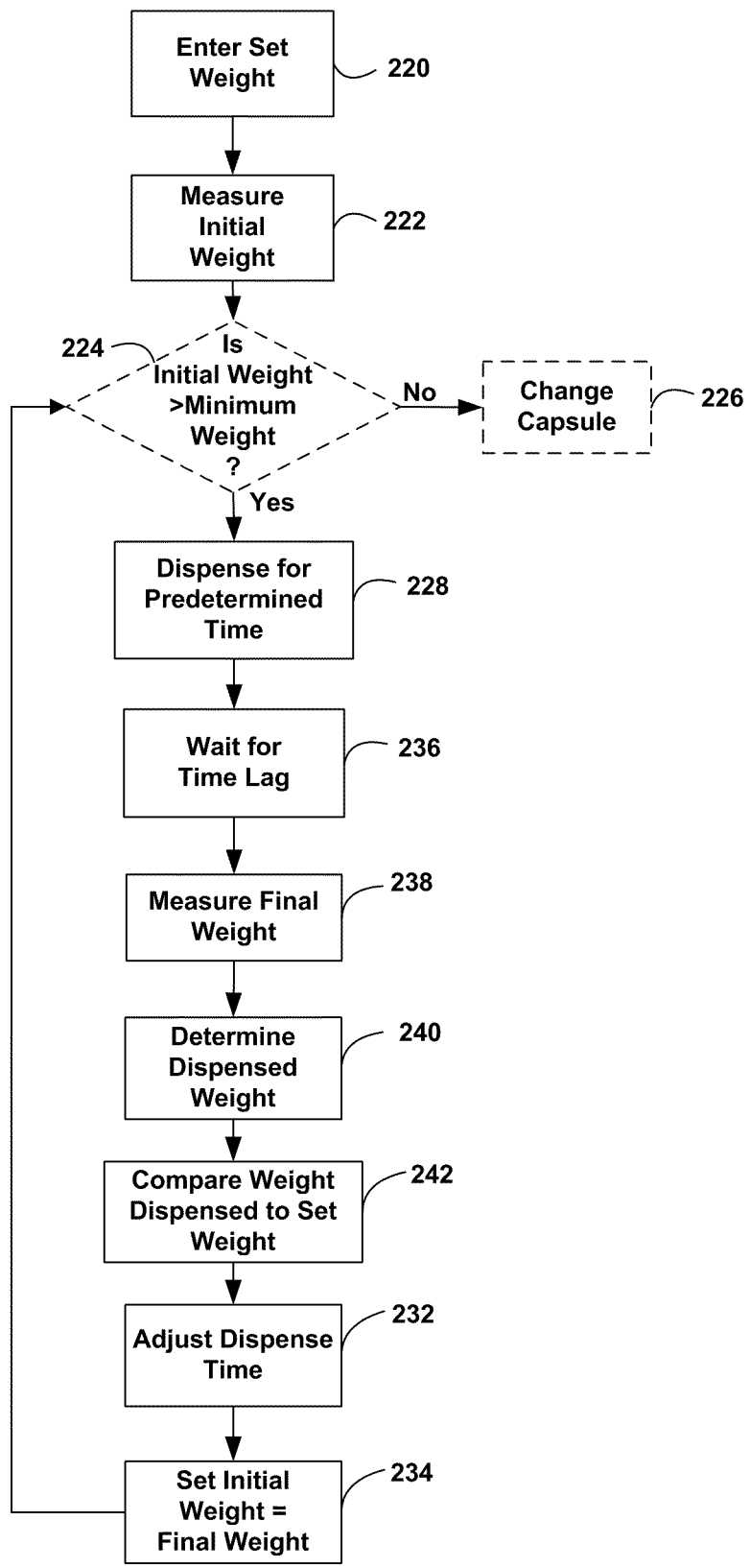
FIG. 7 is a flow chart illustrating a more detailed example of the method illustrated in FIG. 6.

FIG. 7 is a flow chart illustrating a more detailed example method of FIG. 6. Again, the weight to be dispensed is set (220) and the initial weight is measured (222). Similarly, a determination (224) is made on whether the capsule is empty and whether the capsule should be changed (226). Also similarly, the ingredient is dispensed for a predetermined period of time (228). Following dispensing, the process waits (236) for any remaining diluent to drain from the capsule. The final weight is measured (238) and the dispensed weight is determined (240). The weight dispensed is compared (242) to the set weight and the predetermined period of time to dispense for the next cycle is adjusted (232) appropriately. As an example, if the amount dispensed is greater than the set amount, then the period of time to dispense would be adjusted downward. However, if the amount dispensed is less than the set amount, then the period of time to dispense would be adjusted upward. And, of course, if the amount dispensed equals the set amount no adjustment need be made. The initial weight is then set to be equal to the final weight (234) to properly enable the next dispense cycle.

Figure 8:
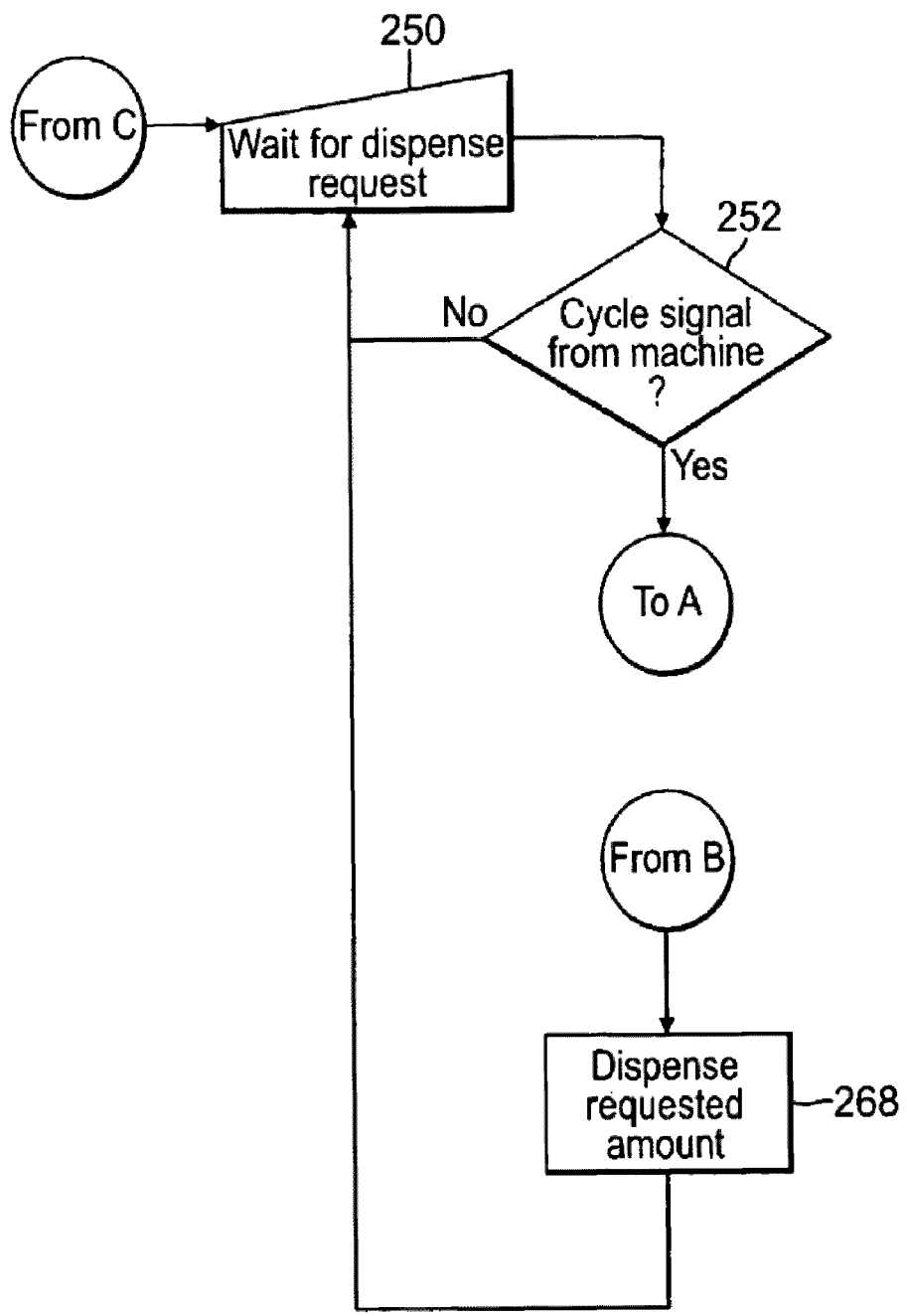
FIG. 8 is a flow chart illustrating a first portion of an example of the invention in which an amount of an ingredient is dispensed based upon a predicted amount of the ingredient needed to maintain an effectiveness of the ingredient.
Figure 9:
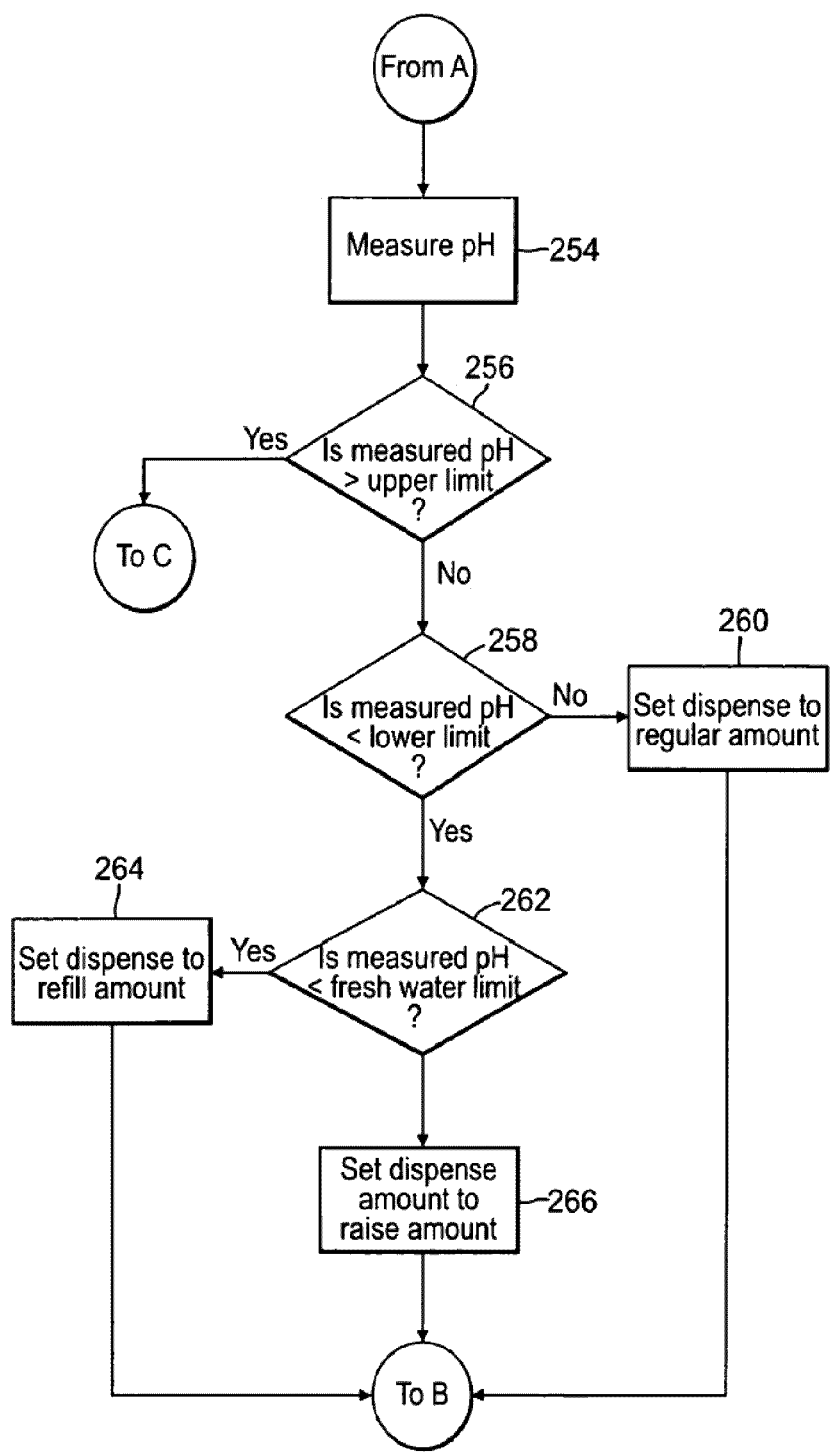
FIG. 9 is a flow chart illustrating a second portion of the method of FIG. 8.

An alternative example of a method of the present invention is illustrated in the flow chart of FIG. 8 and FIG. 9 which can be utilized in any of the dispensers described or other dispensers. The process first waits for a dispense request (250) using the determination (252) based on whether a cycle signal has been received. Once a cycle signal is received, the process measures a factor which, at least in part, is indicative of the effectiveness of the ingredient being dispensed into the machine in which the ingredient is utilized. In one example in a machine in which the ingredient is dispensed into a use solution in a sump, a measurement of the pH of the use solution is indicative of an amount of detergent (for example, an alkaline detergent) contained in the use solution. Thus, by measuring a factor such as pH, a dispenser can predict an amount of ingredient, in this case detergent, which should be dispensed into the machine. It is recognized and understood that the pH of a use solution is just an example of one of many factors which may be indicative of the effectiveness of the ingredient being dispensed. For example with warewashing machines, other examples could include temperature, turbidity, conductivity, water pressure, or another factor not related to the use solution per se such as a degree of soiling of the dishes or the length of time since the last cycle.

In FIG. 9, the pH is measured (254) and a determination (256) on whether the measured pH is greater than an upper limit is made. If the pH is greater than the upper limit, the machine already has too much detergent, the present dispense cycle is skipped and the process returns to 250 to wait for the next dispense request. If, however, the measured pH is not greater than the upper limit, a determination (258) is made on whether the pH is lower than a lower limit. If not, then the detergent amount is within a normal range and the process dispenses (260) a regular amount of detergent for the current dispense cycle. If however, the measured pH is lower than a lower limit, then a determination is made (262) on whether the pH is so low that it is below a fresh water limit which would indicate that the machine's sump has been drained and refilled with fresh water. If it is, a larger refill amount of detergent is dispensed (264). If it is not, the amount of detergent is below the normal range but not so low as to require a refill amount dispense amount. In this case, the regular dispense amount is increased (266) to account for the low amount of detergent. Following (260, 264 and 266), the process returns to FIG. 8 and dispenses (268) the requested amount of detergent.

Figure 10:
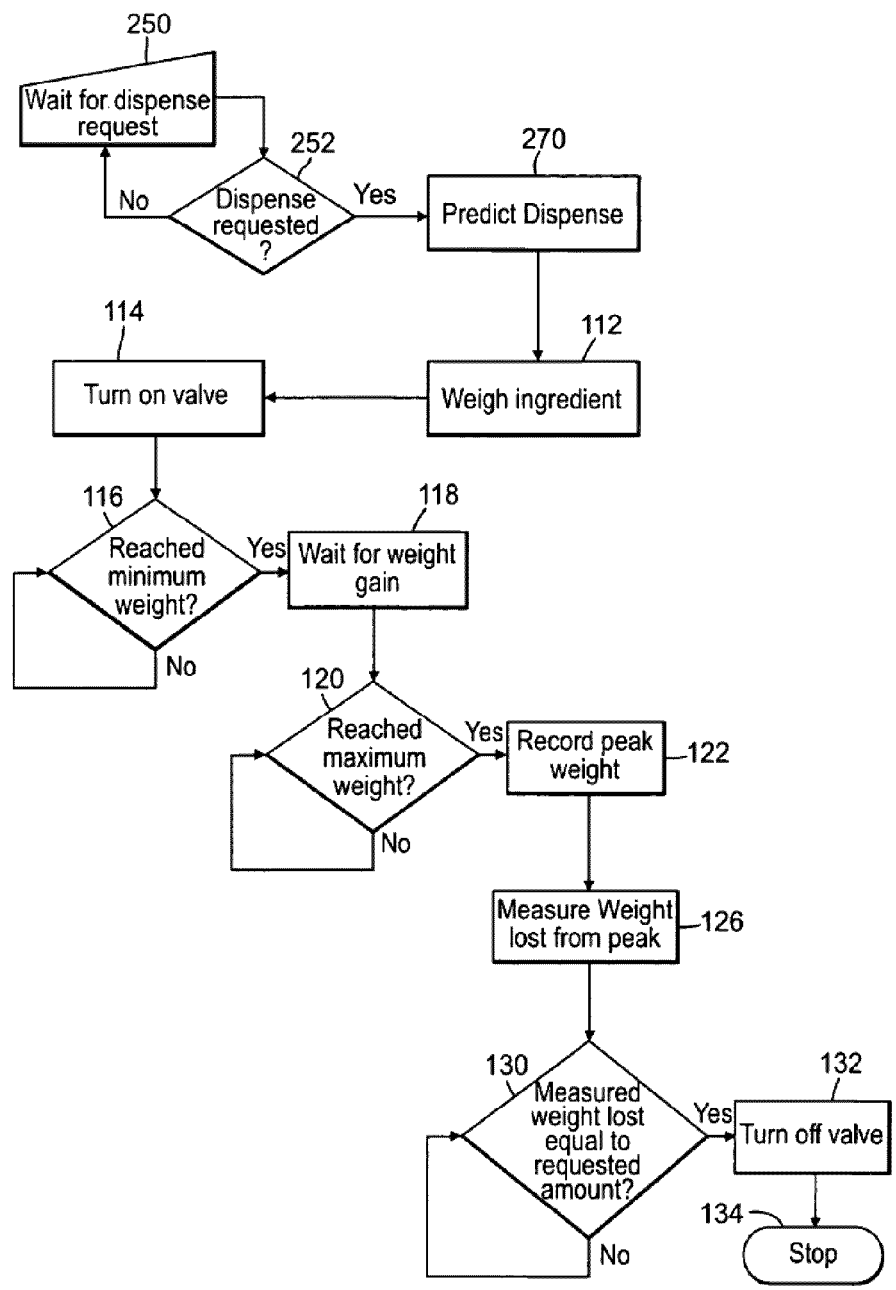
FIG. 10 is a flow chart illustrating an alternative example of the method illustrated in FIG. 8 and FIG. 9.

FIG. 10 is a flow chart illustrating generally how the predictive process of FIG. 9 can be integrated in a dispensing method previously illustrated in FIG. 3. Instead of setting the amount of ingredient to be dispensed (as is done in FIG. 3), the process waits for a dispense request (250) and determines (252) whether a dispense cycle has been requested. If a dispense cycle has been requested, the amount of the ingredient which needs to be dispensed is predicted (270) using the techniques illustrated in FIG. 9. Essentially having substituted the predictive process of FIG. 9 for the manual setting of FIG. 3, the process of FIG. 10 continues essentially identical to the process illustrated in FIG. 3 beginning with (112) without optional steps represented by (124) and (128).

While the methods have been described throughout this description as being useful or utilized in an apparatus in the cleaning industry, for example a warewashing or laundry machine, it is to be recognized and understood that the methods of the present invention have usefulness in other applications as well.

A description of alternative methods of dispensing related to the present invention are described in co-pending U.S. patent application Ser. No. 10/436,888, entitled "Methods of Managing Based on Measurements of Actual Use of Product," by Bryan Maser et al, the entire content of which is incorporated herein by reference.

The present invention has applicability in many areas in addition to those already discussed. The following is a list of at least some of the areas in which the invention may be used. In the area of pest elimination dispensing equipment, a load cell could be utilized to measure a pre-set amount of ready-to-use insecticide which would enable the user to document proof of delivery for regulatory compliance, while ensuring a consistent dose was used for each application. Use in the vehicle cleaning market could encompass the use of a chemical measurement device for a vehicle care product dispenser. The product could be in a solid, liquid, gel, paste, pellets, tablets, or other form. Delivery would be by conventional means such as a recirculating system for solid products or pump systems for liquids or gels. The load cell would measure precise weight changes in the product being delivered to create a ready-to-use solution or an intermediate solution that can be diluted at a user's convenience.

Still another area where the present invention could be utilized is in the janitorial and health care areas. The janitorial business would be able to utilize the technology of the present invention for accurately dispensing two component chemistries as well as cross linking chemistries for floor care. For health care, the present invention would be able to be utilized for proof of delivery for sanitizers and disinfectants. There is also the need to deliver very accurate amounts of chemistry for instrument care and hard surface cleaning. The technology would be available for both liquid and solid products. The present invention is also applicable for housekeeping. The invention is able to be utilized as a platform for accurate solid, liquid or concentrate proportioning when it is used in conjunction with a device that can quantify an amount of water passing through a pipe. For example, if a known volume of water is used, and the load cell could detect the amount of concentrate dispensed, a proportion would be known. So in an accurate dispenser of this kind, the user would set a proportion. While water is filling up the use vessel, the concentrate is dispensed. Dispensing the concentrate occurs until the proportion is satisfied. If a known amount of water is passed through a pipe in a fixed time, the dispenser could dispense the concentrate to satisfy the proportion. For example, if 100 milliliters of water is passed through the dispenser, a known amount of concentrate would be needed to satisfy the set proportion. The known amount of concentrate could be dispensed and stopped, when the load cell is satisfied. The present invention is also applicable for laundry systems. The foregoing is not an exhaustive list but are just further examples of the applicability of the present invention.

In another example, a chemical product dispenser dispenses a chemical product having at least one active ingredient during a primary dispense cycle based on time or some other factor, and may also dispense the chemical product during a make-up dispense cycle. After completion of the primary dispense cycle, the dispenser determines the amount of chemical product that was dispensed. The dispenser then determines whether the dispensed amount of chemical product is within a defined threshold of the desired amount. If not, in this example, the dispenser proceeds to dispense additional chemical product during one or more make-up dispense cycles until the threshold is satisfied.

Figure 13:
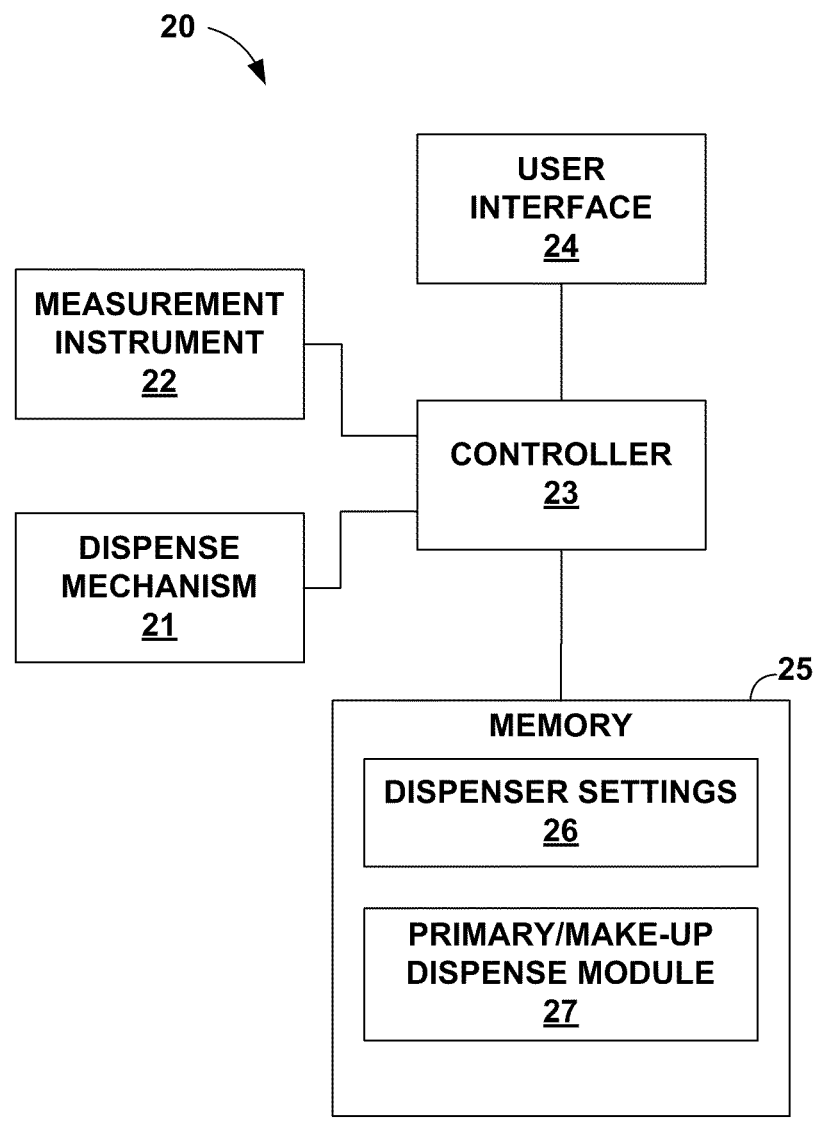
FIG. 13 is a block diagram illustrating an example of a chemical product dispenser that includes make-up dispense cycle capability.

FIG. 13 is a block diagram illustrating an example of a chemical product dispenser that includes make-up dispense cycle capability. In this generalized example, a dispenser 20 includes a controller 23, a user interface 24 a memory 25, a measurement instrument 22 and a dispense mechanism 21. Controller 23 manages dispensing of chemical product by controlling the dispense mechanism (e.g., an electronically controllable valve that dispenses a fluid chemical product, a dispenser that sprays a solid block of chemical product with a diluent, a pellet dispenser, a flow meter, or some other electronically controllable dispense mechanism) that dispenses the chemical product. Measuring instrument 22 determines the weight of the chemical product at various points throughout the product dispense cycle. Memory 25 stores the data and control software that governs operation of the controller 23. For example, memory 25 may include dispenser settings 26 that specify target amounts for one or more chemical product(s) to be dispensed; timing, sequences and amounts of one or more chemical products to be dispensed; or other dispenser settings. Memory 25 may also include a primary/make-up dispense module 27 that allows controller to manage dispensing of the chemical product during the primary dispense cycle and provides make-up dispense cycle capability.

As discussed above, the chemical product to be dispensed may be contained within a product capsule, or may be loaded directly into the relevant chemical product dispenser, such as into a product reservoir, tank, tray, hopper, etc. within the dispenser. The chemical product may be a solid concentrate; an extruded solid; a pressed solid; a liquid; a gel; a powder; a paste; may take the form of tablets, pellets or other form of unit dose of the chemical product; or may be any other form of chemical product known or will be known to those of skill in the art. In general, the invention is not limited with respect to the form of the chemical product and/or the particular mechanism by which they are dispensed. Rather, it shall be understood that the invention relates generally to mass or weight-based dispensation of chemical product, regardless of the form of the chemical product or the particular mechanism by which the chemical product is dispensed. Thus, for example, solid products (whether extruded, pressed, or other form of solid product) may be dispensed via erosion with a diluent, chipping, blocking or cutting; liquids or gels may be dispensed via pumping or via gravity from a chemical product container or, if loaded directly into the dispenser, from a reservoir within the dispenser; pastes may be dispensed from a squeeze tube; tablets or pellets may be dispensed via a mechanical mechanism for releasing tablets or pellets; powders may be dispensed from a product capsule or from a reservoir within a product container, etc. Any of these such chemical products/dispensers may incorporate mass or weight-based dispensing, and the make-up dispense cycle described herein may thus be incorporated into any of such chemical product dispensing systems.

In addition, although an example mass or weight based dispensing system utilizing load cells and strain gauges as the mechanism for determining the mass or weight of the chemical product is described above, it shall be understood that other implementations may also be used, and that the invention is not limited in this respect. For example, the measuring instrument (shown in general as measurement instrument 22 in FIG. 13) that determines the mass or weight of the chemical product used in a particular system implementation may depend in part upon one or more of the following: the dispenser type, the dispenser configuration, the type of chemical product being dispensed, and/or the type of container or capsule (if any) from which the chemical product is to be dispensed. Thus, it shall be understood that the mass or weight of the chemical product may be determined using any appropriate measuring instrument for determining mass or weight, such as analog scales, digital or electronic scales, platform scales, hanging scales, spring scales, balance scales, hydraulic scales, other mechanisms for measuring displacement of a beam (such as optical sensors, capacitive sensor, linear displacement sensor, etc.), and others.

Figure 11:
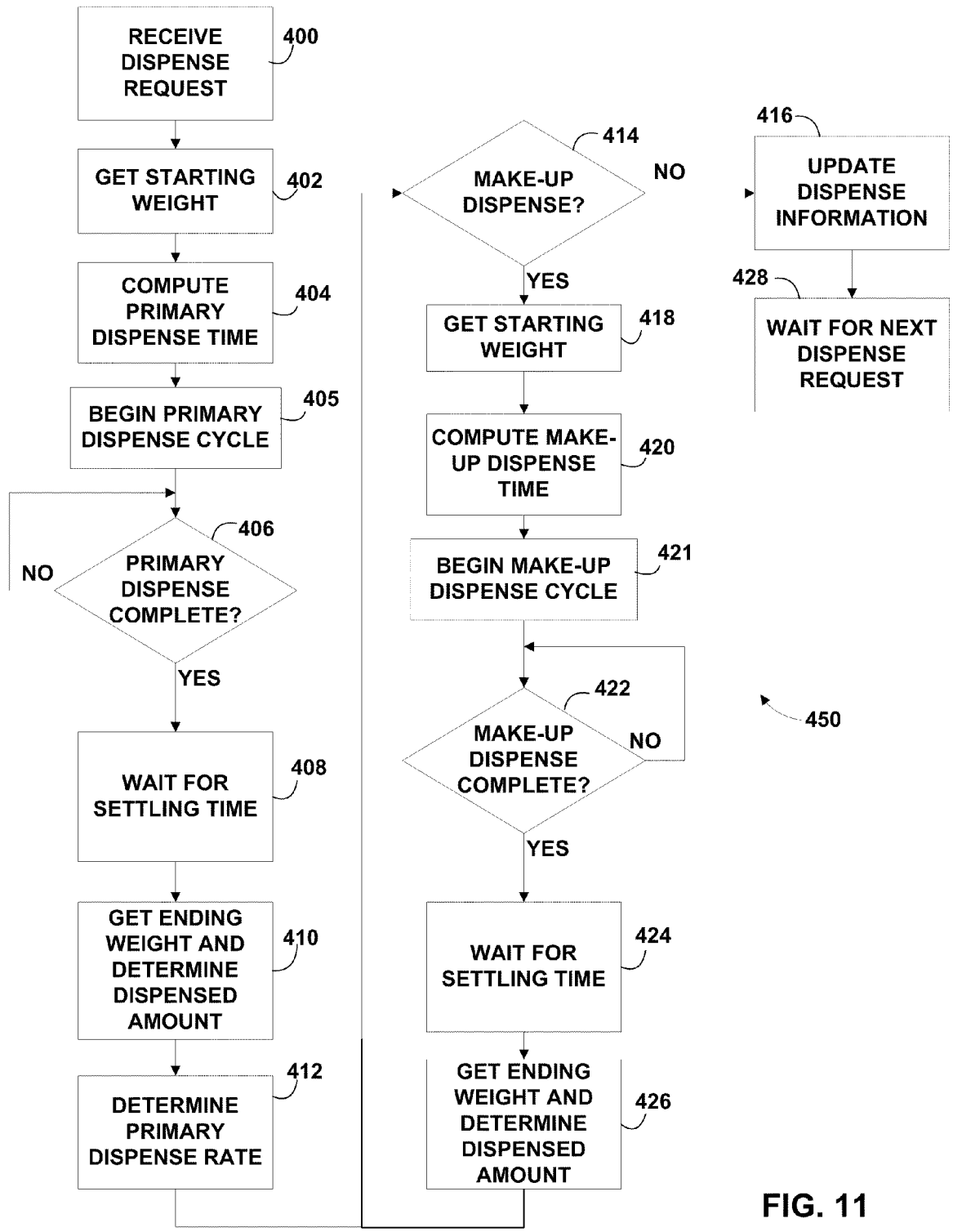
FIG. 11 is a flowchart illustrating an example chemical product dispensing process that includes a make-up dispense.

FIG. 11 is a flowchart illustrating an example chemical product dispensing process 450 that includes at least one make-up dispense cycle. In the example process of FIG. 11, the process is described in general with respect to a dispenser that dispenses on the basis of time. More specifically, process 450 is described with respect to a dispenser that dispenses a chemical product by eroding the chemical product with a diluent for a predetermined period of time (the "dispense time"). However, it shall be understood that process 450 may be adapted for dispensers that dispense via means other than eroding, or that dispense based on other factor(s). For example, the process 450 may be adapted for use in a dispenser that dispenses a liquid chemical product for a predetermined period of time (e.g., dispense for a predetermined amount of time at a given flow rate to dispense a desired amount of the liquid chemical product). As another example, the process 450 may be adapted for dispensers that control or predict an amount of chemical product to be dispensed based on pH, temperature, turbidity, conductivity, water pressure or other factor. It shall be understood, therefore, that although the make-up dispense process is described and shown herein with reference to dispenser that dispense on the basis of time, it shall be understood that the invention is not limited in this respect.

A dispense cycle begins when a dispense request is received (400) at which point the controller (such as controller 23 in FIG. 13) gets the starting weight (402) of the chemical product remaining in the dispenser. In this example, the starting weight may be the current weight of the chemical product remaining in the dispenser as determined after the previous dispense request and stored in memory, or the current weight may be measured directly. Alternatively, the starting weight may be the weight of a new chemical product after it has been loaded into the dispenser if this is the chemical product's first dispense cycle.

The controller computes the dispense time required to dispense the requested amount of chemical product during the primary dispense cycle (404). To compute the dispense time for the primary dispense cycle, the controller divides the desired amount of product to be dispensed by the dispense rate. The dispense rate used to compute the dispense time may be the dispense rate corresponding to the previous primary dispense cycle. This is because the dispense rate corresponding to the previous primary dispense cycle may be a good indicator of the dispense rate that will be experienced during the current primary dispense cycle. Alternatively, the dispense rate used to compute the dispense time may be an average (or mean, or other mathematical construct) of a plurality of dispense rates each corresponding to one of a plurality of previous primary dispense cycles (i.e., an "averaged dispense rate"), where the determined number of previous primary dispense cycles used for the averaging may be any integer between 1 and the total number of primary dispense cycles since the chemical product was initially loaded into the dispenser. This is because the so-called averaged dispense rate may be a good indicator of the dispense rate that will be experienced during the current primary dispense cycle.

For example, when using the dispense rate corresponding to the previous primary dispense, i−1, the primary dispense time for the current primary dispense cycle, i, may be determined using the equation:

$$(\text{primary dispense time}_i) = (\text{desired amount}_i)/(\text{primary dispense rate}_{i-1})$$

Alternatively, as mentioned above, the primary dispense rates corresponding to the previous n primary dispenses may be averaged:

$$(\text{primary dispense time}_i) = (\text{desired amount}_i)/\text{avg}(\text{primary dispense rate}_{i-1, i-2 \ldots (i-n)})$$

After the primary dispense time is computed (404), the controller begins the primary dispense cycle (405). The primary dispense cycle continues until the primary dispense cycle is complete (406). In this example, the primary dispense cycle is complete when the computed primary dispense time has elapsed. In other examples, the primary dispense cycle is complete when the relevant factor is satisfied.

In this example in which a solid block of chemical product is eroded with a diluent, when the primary dispense cycle is complete (406) the controller waits for a predetermined period of time referred to as the settling time (408). The settling time is a predetermined amount of time required for remaining diluent to drain from the product capsule and/or the dispenser housing, and for the measurement system to come to equilibrium. However, it shall be understood that in other types of dispensing systems (e.g., those not based on eroding a chemical product with a diluent) such a settling time may not be required, and that the invention is not limited in this respect. The controller then measures the ending weight of the chemical product and determines the dispensed amount (410).

For example, the controller may determine the dispensed amount by subtracting the ending weight remaining after the primary dispense cycle from the starting weight at the beginning of the primary dispense cycle:

$$(\text{primary dispensed amount}_i) = (\text{primary starting amount}_i) - (\text{primary ending amount}_i).$$

Once the dispensed amount has been determined, the controller determines the primary dispense rate corresponding to the just completed primary dispense cycle (412). For example, the dispense rate corresponding to the just completed primary dispense cycle, i, may be determined using the equation:

$$\text{primary dispense rate}_i = (\text{dispensed amount}_i)/(\text{primary dispense time}_i).$$

The primary dispense rate corresponding to the just completed primary dispense cycle (primary dispense rate$_i$) may be used to compute the dispense time of the next primary dispense cycle (dispense time$_{i+1}$), or it may be combined as described above with the dispense rates corresponding to the previous n primary dispense cycles.

Once primary dispense cycle is complete, the controller further determines whether a make-up dispense cycle is required (414). To determine whether a make-up dispense cycle is required, the controller determines the difference between the dispensed amount and the desired amount. If the difference between the dispensed amount and the desired amount satisfies a make-up threshold, a make-up dispense cycle is not required. For example, if the make-up threshold is 0.5 grams, and the difference between the dispensed amount and the desired amount is less than 0.5 grams, or if the dispensed amount is greater than the desired amount, a make-up dispense cycle is not required. If no make-up dispense cycle is required, the controller may update the dispenser memory with the dispense information from the just-completed primary dispense cycle (e.g., the dispense rate, the amount of chemical product dispensed, date and time stamp, increment the number of times chemical product has been dispensed, etc.) (416). The controller then waits for the next dispense request (428).

If the difference between the dispensed amount and the desired amount does not satisfy the make-up threshold, the controller may determine that a make-up dispense cycle is required (414). For example if the make-up threshold is 0.5 grams, and the difference between the desired amount and the dispensed amount is greater than 0.5 grams, the controller may determine that a make-up dispense cycle is required. It shall be understood that the make-up threshold may be greater or less than 0.5 grams and that the make-up threshold may depend upon several factors, such as the starting weight of the chemical product, the type of chemical product being dispensed, the desired amount of chemical product to be dispensed, and/or the accuracy required for the particular chemical product being dispensed (in some applications, higher accuracy of the dispensed amount may be required than in other applications). The make-up threshold may be expressed in terms of an absolute weight (e.g., 0.5 grams, 1 gram, 0.1 lbs, 0.25 kg, 2 kg, etc.), by a percentage of the desired dispensed amount (e.g., within 0.5%, 1%, 5%, etc.), or by some other means. It shall be understood, therefore, that the invention is not limited in these respects.

If a make-up dispense cycle is required (414) the controller proceeds to execute at least one make-up dispense cycle. The controller gets the starting weight of the chemical product (418). In this example, if this is the first make-up dispense cycle, the starting weight (418) will be the ending weight determined from the associated primary dispense cycle (410). If this is not the first make-up dispense cycle, the starting weight (418) will be the ending weight determined from the previous make-up dispense cycle (426). Alternatively, the starting weight could be measured directly.

The controller computes the make-up dispense time required to dispense the difference between the dispensed amount and the desired amount (420). The controller may compute the make-up dispense time by dividing the difference between the dispensed amount and the desired amount by the dispense rate corresponding to the associated primary dispense cycle (shown for simplicity in the following equation), or by an average of a plurality of dispense rates each corresponding to one of a plurality of previous primary dispense cycles:

$$(\text{make-up dispense time}_i) = (\text{difference}_i)/(\text{primary dispense rate}_i)$$

The controller then controls the dispenser to begin the make-up dispense cycle (421) and continues dispensing of chemical product until the make-up dispense cycle is complete (in this example, when the make-up dispense time has elapsed). The controller waits for the settling time (424) (if applicable), measures the ending weight after the make-up dispense cycle and computes the total dispensed amount (426):

$$(\text{dispensed amount}_{total}) = (\text{primary starting amount}_i) - (\text{make-up ending amount}_i).$$

The controller then compares the difference between the desired amount and the total dispensed amount and determines whether the make-up threshold is satisfied. If not, further make-up dispense cycles may be executed (418-426) in an iterative fashion until the make-up threshold is satisfied (414).

In this example, the controller uses the dispense rate corresponding to the associated primary dispense cycle or for an average of the previous n primary dispense cycles to compute the dispense time for each iterative make-up dispense cycle. Alternatively, the dispense rate corresponding to each make-up dispense cycle (if any) may also be calculated and taken into account along with the dispense rates corresponding to the primary dispense cycle(s).

Figure 12:
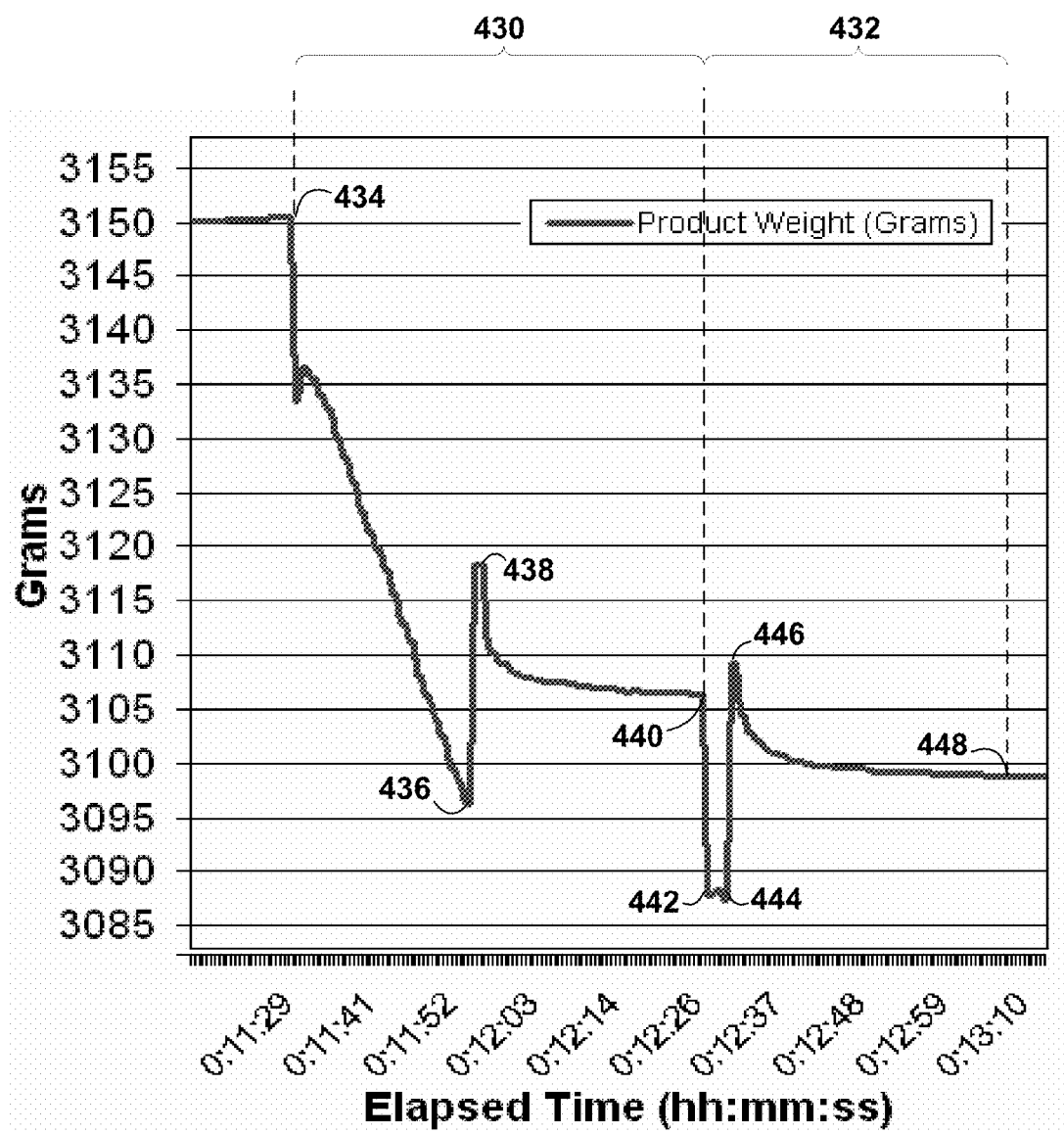
FIG. 12 is a graph of product weight vs. time illustrating an example of a primary dispense cycle and an associated make-up dispense cycle.

FIG. 12 is an example graph of product weight versus time for a primary dispense cycle 430 and an associated make-up dispense cycle 432. At time 434, a dispense request is received, the primary dispense cycle time is computed and the primary dispense cycle begins. The primary dispense cycle continues until time 436 (after the computed primary dispense time has elapsed), at which point the dispensing is discontinued. Because in this example chemical product is dispensed by eroding the chemical product with a diluent, discontinuing the spray of diluent at time 436 results in a momentary weight gain (e.g., at time 438) for the combined weight as the upward pressure on the block of ingredient is discontinued. Following the momentary weight gain cause by the lack of upward pressure on the block of ingredient by the spray of diluent, diluent continues to drain from capsule resulting in the ending weight of the primary dispense cycle at approximately time 440.

At time 440, the dispensed amount of chemical product is determined. The difference between the starting weight (approximately 3150 grams at time 434 in this example) and the ending weight (approximately 3106 grams at time 440 in this example) once the diluent has drained from the capsule (in this example, or from the dispenser reservoir if the chemical product is not contained in a capsule) represents the amount dispensed (44 grams in this example). In addition, the dispense rate (dispensed amount/dispense time (from time 434 to time 436)) corresponding to the primary dispense is determined.

Also at time 440, the system determines whether a make-up dispense is required. Assuming, for purposes of this example, that the desired amount to be dispensed is 50 grams, and that the make-up threshold is 1 gram (or 0.5%), a comparison of the desired amount and the dispensed amount yields a difference of 6 grams (50 grams−44 grams=6 grams). The make-up threshold is therefore not satisfied and a make-up dispense cycle 432 is initiated at time 442.

The make-up dispense cycle time is determined and the make-up dispense cycle is initiated. The make-up dispense cycle continues until time 444, at which point the make-up dispense cycle time has elapsed and dispensing of the product is discontinued. Once again, in this example, discontinuing the spray of diluent at time 444 results in a momentary weight gain (e.g., at time 446) for the combined weight as the upward pressure on the block of ingredient is discontinued. Following the momentary weight gain cause by the lack of upward pressure on the block of ingredient by the spray of diluent, diluent continues to drain from capsule resulting in the ending weight of the make-up dispense cycle at approximately time 448.

At time 448, the total amount dispensed during the primary and make-up dispense cycles is determined. The difference between the starting weight (approximately 3150 grams at time 434 in this example) and the ending weight (approximately 3107 grams at time 3099 in this example) once the diluent has drained from capsule (51 grams in this example) represents the total amount dispensed during the primary and make-up dispense cycles.

Also at time 448, the system determines whether another make-up dispense cycle is required. In this example, a comparison of the desired amount and the total dispensed amount yields a difference of −1 grams (50 grams−51 grams=−1 grams). The make-up threshold is therefore satisfied and no further make-up dispense cycles are required in this example. However, if at time 448 the make-up threshold were not satisfied, additional make-up dispenses could be executed until the make-up threshold is satisfied.

The techniques described in this disclosure, including functions performed by a controller, control unit, or control system, may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors or controllers.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of mass dispensing applications and devices. In some aspects, for example, such components may form part of a mass dispenser, or be coupled functionally to such a mass dispenser.

If implemented in part by software, the techniques may be realized at least in part by a computer-readable data storage medium comprising code with instructions that, when executed by one or more processors or controllers, performs one or more of the methods described in this disclosure. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various embodiments of the invention have been described. These and other embodiments are within the scope of the following claims.

The invention claimed is:

1. A method comprising:
dispensing a chemical product from a weight based dispenser for a predetermined period of time during a primary dispense cycle, the predetermined period of time based on a dispense rate corresponding to at least one previous primary dispense cycle and a desired amount of the chemical product to be dispensed;
determining a dispensed amount of the chemical product based on a start weight of the chemical product in the dispenser at a start of the primary dispense cycle and an end weight of the chemical product in the dispenser after the predetermined period of time has elapsed;
calculating a difference between the desired amount of the chemical product and the dispensed amount of the chemical product;
determining whether a make-up dispense cycle is required based on the difference; and
if a make-up dispense cycle is required, executing a make-up dispense cycle, wherein executing a make-up dispense cycle comprises:
determining a dispense rate corresponding to the primary dispense cycle, wherein determining the dispense rate corresponding to the primary dispense cycle comprises dividing the dispensed amount of the chemical product by the predetermined period of time;
computing a make-up dispense cycle time based on the difference between the desired amount and the dispensed amount and the dispense rate corresponding to the primary dispense cycle; and
dispensing the chemical product for the computed make-up dispense cycle time, wherein dispensing the chemical product comprises eroding the chemical product with a diluent.

2. The method of claim 1 wherein determining whether a make-up dispense cycle is required comprises:
comparing the difference between the desired amount of the chemical product and the dispensed amount of the chemical product with a make-up threshold; and
determining that a make-up dispense cycle is required if the difference does not satisfy the make-up dispense threshold.

3. The method of claim 2 wherein determining that a make-up dispense cycle is required comprises determining that a make-up dispense cycle is required if the difference exceeds the make-up dispense threshold.

4. The method of claim 1, wherein the predetermined period of time is based on an average of a plurality of dispense rates each corresponding to one of a plurality of previous primary dispense cycles and a desired amount of the chemical product to be dispensed.

5. The method of claim 1 further comprising dispensing the chemical product during each of a plurality of iterative make-up dispense cycles until a make-up dispense threshold is satisfied.

6. The method of claim 1 further comprising computing the make-up dispense time by dividing the difference by the dispense rate corresponding to the primary dispense cycle.

7. The method of claim 1 further comprising computing the make-up dispense time by dividing the difference by an average of a plurality of dispense rates each corresponding to one of a plurality of previous primary dispense cycles.

8. A system comprising:
a weight based chemical product dispenser that dispenses a chemical product during a primary dispense cycle for a predetermined primary dispense time, the predetermined primary dispense time based on a dispense rate corresponding to at least one previous primary dispense cycle and a desired amount of the chemical product to be dispensed;
a measuring instrument that determines a starting weight of the chemical product at a beginning of the primary dispense cycle and that determines an ending weight of the chemical product at an end of the primary dispense cycle; and
a controller that determines a dispensed amount of the chemical product based on a difference between the starting weight of the chemical product and the ending weight of the chemical product, calculates a difference between the desired amount of the chemical product and the dispensed amount of the chemical product, and determines whether a make-up dispense cycle is required based on the difference,
further wherein if a make-up dispense cycle is required, the controller:
determine a dispense rate corresponding to the primary dispense cycle, wherein the dispense rate corresponding to the primary dispense cycle is determined by dividing the dispensed amount of the chemical product by the predetermined primary dispense time;
computes a make-up dispense cycle time based on the difference between the desired amount and the dispensed amount and the dispense rate corresponding to the primary dispense cycle; and
controls dispensation of the chemical product during the make-up dispense cycle for the computed make-up dispense cycle time,
wherein the chemical product dispenser dispenses the chemical product by eroding the chemical product with a diluent for the primary dispense time.

9. The system of claim 8, wherein the chemical product is one of a solid concentrate, an extruded solid, a pressed solid, a liquid, a gel, a paste, a powder, tablets, pellets, or a unit dose form of chemical product.

10. The system of claim 8, wherein the chemical product is contained within product capsule that is loaded into the dispenser.

11. The system of claim 8, wherein the chemical product dispenser dispenses the chemical product directly from the chemical product dispenser.

12. The system of claim 8 wherein the controller compares the difference between the desired amount of the chemical product and the dispensed amount of the chemical product with a make-up threshold and determines that a make-up dispense cycle is required if the difference does not satisfy the make-up dispense threshold.

13. The system of claim 8 wherein the controller computes the make-up dispense cycle time by dividing the difference by the dispense rate corresponding to the primary dispense cycle.

14. The system of claim 8 wherein the controller computes the make-up dispense cycle time by dividing the difference by an average of a plurality of dispense rates each corresponding to one of a plurality of previous primary dispense cycles.

15. A method comprising:
dispensing a chemical product from a weight based dispenser for a predetermined period of time during a primary dispense cycle, the predetermined period of time based on a dispense rate corresponding to at least one previous primary dispense cycle and a desired amount of the chemical product to be dispensed;
determining a dispensed amount of the chemical product based on a start weight of the chemical product in the dispenser at a start of the primary dispense cycle and an end weight of the chemical product in the dispenser after the predetermined period of time has elapsed;
calculating a the difference between the desired amount of the chemical product and the dispensed amount of the chemical product;
determining whether a make-up dispense cycle is required based on the difference; and
if a make-up dispense cycle is required, executing one or more make-up dispense cycles, wherein executing each of the one or more make-up dispense cycles comprises:
determining a dispense rate corresponding to a previous dispense cycle, wherein determining the dispense rate corresponding to the previous dispense cycle comprises dividing an amount of the chemical product dispensed during the previous dispense cycle by an amount of time during which the chemical product was dispensed during the previous dispense cycle;
computing a make-up dispense cycle time based on the difference between the desired amount and the amount of chemical product dispensed during the primary dispense cycle and any previous make-up dispense cycles and the dispense rate corresponding to the previous dispense cycle; and
dispensing the chemical product for the computed make-up dispense cycle time,
wherein the chemical product dispenser dispenses the chemical product by eroding the chemical product with a diluent for the primary dispense time.

* * * * *